(12) United States Patent
Kwon et al.

(10) Patent No.: US 12,067,794 B2
(45) Date of Patent: Aug. 20, 2024

(54) SERVER, ELECTRONIC DEVICE, AND CONTROL METHODS THEREFOR

(71) Applicant: SAMSUNG ELECTRONICS CO., LTD., Suwon-si (KR)

(72) Inventors: Jaehyun Kwon, Suwon-si (KR); Jinwoo Nam, Suwon-si (KR); Gilwoo Song, Suwon-si (KR); Heeseung Shin, Suwon-si (KR); Minseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 355 days.

(21) Appl. No.: 17/520,245

(22) Filed: Nov. 5, 2021

(65) Prior Publication Data
US 2022/0058375 A1  Feb. 24, 2022

Related U.S. Application Data

(63) Continuation of application No. PCT/KR2020/016640, filed on Nov. 24, 2020.

(30) Foreign Application Priority Data

Feb. 21, 2020  (KR) .................. 10-2020-0021746

(51) Int. Cl.
*G06T 7/70* (2017.01)
*G06T 7/00* (2017.01)
(Continued)

(52) U.S. Cl.
CPC ............ *G06V 20/95* (2022.01); *G06T 7/0002* (2013.01); *G06T 7/70* (2017.01); *G06V 10/764* (2022.01);
(Continued)

(58) Field of Classification Search
CPC ...... G06V 20/95; G06V 10/764; G06V 10/82; G06V 40/16; G06V 10/56; G06V 40/162;
(Continued)

(56) References Cited

U.S. PATENT DOCUMENTS 8,805,018 B2   8/2014  Li et al.
9,965,610 B2   5/2018  Chandraker et al.
(Continued)

FOREIGN PATENT DOCUMENTS

CN   109711243 A   5/2019
JP      4709473 B2   6/2011
(Continued)

OTHER PUBLICATIONS

International Search Report dated Mar. 12, 2021 issued by the International Searching Authority in International Application No. PCT/KR2020/016640 (PCT/ISA/210).
(Continued)

*Primary Examiner* — Stephen P Coleman
(74) *Attorney, Agent, or Firm* — Sughrue Mion, PLLC

(57) ABSTRACT

A server and an electronic device for identifying a fake image are provided. The server includes a memory storing an artificial intelligence model trained to identify a fake image; and a processor connected to the memory, and configured to identify whether an image is the fake image by inputting the image to the artificial intelligence model, wherein the artificial intelligence model is a model trained based on an original image and a sample fake image, each including information about a landmark of a face area.

13 Claims, 26 Drawing Sheets

(51) Int. Cl.
*G06V 10/764* (2022.01)
*G06V 10/82* (2022.01)
*G06V 20/00* (2022.01)
*G06V 40/16* (2022.01)

(52) U.S. Cl.
CPC .............. *G06V 10/82* (2022.01); *G06V 40/16* (2022.01); *G06T 2200/24* (2013.01); *G06T 2207/20081* (2013.01); *G06T 2207/20084* (2013.01); *G06T 2207/30201* (2013.01)

(58) Field of Classification Search
CPC .. G06V 40/168; G06V 40/175; G06V 40/172; G06T 7/0002; G06T 7/70; G06T 2200/24; G06T 2207/20081; G06T 2207/20084; G06T 2207/30201; G06N 20/00
USPC ........................................................ 382/118
See application file for complete search history.

(56) References Cited

U.S. PATENT DOCUMENTS

| | | | |
|---|---|---|---|
| 10,121,059 | B2 | 11/2018 | Yoo et al. |
| 2008/0031496 | A1 | 2/2008 | Takagi |
| 2011/0010455 | A1 | 1/2011 | Wolfe et al. |
| 2014/0307929 | A1 | 10/2014 | Nechyba et al. |
| 2015/0310259 | A1* | 10/2015 | Lau ...................... G06V 40/169 382/118 |
| 2017/0098122 | A1 | 4/2017 | el Kaliouby et al. |
| 2018/0285628 | A1 | 10/2018 | Son et al. |
| 2019/0228248 | A1 | 7/2019 | Han et al. |
| 2019/0236614 | A1* | 8/2019 | Burgin ................. G06V 10/764 |

FOREIGN PATENT DOCUMENTS

| | | |
|---|---|---|
| JP | 4952125 B2 | 6/2012 |
| JP | 2013-38468 A | 2/2013 |
| JP | 2019-508801 A | 3/2019 |
| KR | 10-2017-0006355 A | 1/2017 |
| KR | 10-2018-0022019 A | 3/2018 |
| KR | 10-2019-0029800 A | 3/2019 |
| KR | 10-2019-0093759 A | 8/2019 |
| KR | 10-2019-0098858 A | 8/2019 |
| KR | 10-2019-0100529 A | 8/2019 |

OTHER PUBLICATIONS

Written Opinion dated Mar. 12, 2021 issued by the International Searching Authority in International Application No. PCT/KR2020/016640 (PCT/ISA/237).
"Fake Image Detector", Apps on Google Play, 2021, 5 pages total, https://play.google.com/store/apps/details?id=fake_image_detector.coder.genuine.com.fakeimagedetector&hl=en_CA&gl=US.
"Photo Forgery Detection Module", Belkasoft, 2002, 4 pages total, https://belkasoft.com/ru/forgery-detection.
"Image Verification Assistant", reveal-mklab, 2021, 2 pages total, http://reveal-mklab.iti.gr/reveal/.
"Lomin FFD", Lomin, 1 page total, https://www.lomin.ai/face.

* cited by examiner

BRIGHTNESS DIFFERENCE BETWEEN FOREHEAD AREA AND CHEEK AREA : $Z_1$
BRIGHTNESS DIFFERENCE BETWEEN FOREHEAD AREA AND CHEEK AREA : $Z_2$

⋮

BRIGHTNESS DIFFERENCE BETWEEN FOREHEAD AREA AND CHEEK AREA : $Z_n$

SERVER, ELECTRONIC DEVICE, AND CONTROL METHODS THEREFOR

CROSS-REFERENCE TO RELATED APPLICATION(S)

This application is a by-pass continuation application of International Application No. PCT/KR2020/016640 filed Nov. 24, 2020, which is based on and claims priority to Korean Patent Application No. 10-2020-0021746 filed Feb. 21, 2020 in the Korean Intellectual Property Office, the disclosures of which are incorporated by reference herein in their entireties.

BACKGROUND

1. Field

This disclosure relates to a server, an electronic device, and a control method thereof and, more specifically, to a server, an electronic device, and a control method thereof for identifying a fake image.

2. Description of Related Art

A fake image may refer to an image in which the face or face area included in an original image is synthesized with another person's face or face area.

By the recent development of deep learning technology, ordinary people may generate a sophisticated fake image, and damage caused by distribution of fake news, pornography, or the like, including the fake image, has been increasing.

Accordingly, there is a need to find a way to identify a fake image.

SUMMARY

Provided are a server, an electronic device, and a control method thereof, capable of identifying whether an image is a fake image by using an artificial intelligence model trained by original images and fake images including information on a landmark.

Additional aspects will be set forth in part in the description which follows, and in part, will be apparent from the description, or may be learned by practice of the presented embodiments.

In accordance with an aspect of the disclosure, there is provided a server including: a memory storing an artificial intelligence model trained to identify a fake image; and a processor connected to the memory, and configured to: identify whether an image is the fake image by inputting the image to the artificial intelligence model, wherein the artificial intelligence model is a model trained based on an original image and a sample fake image, each including information about a landmark of a face area.

The artificial intelligence model is trained based on the original image in which a first pixel value of a first pixel corresponding to a first landmark in a first face area included in the original image is adjusted to a first predetermined pixel value and based on the sample fake image in which a second pixel value of a second pixel corresponding to a second landmark in a second face area included in the sample fake image is adjusted to a second predetermined pixel value.

The artificial intelligence model trained based on at least one of a range of a color value of the face area included in each of a plurality of original images and a plurality of sample fake images, and a difference in a brightness value between a forehead area of the face area and a cheek area of the face area.

The artificial intelligence model is one of a plurality of artificial intelligence models stored in the memory, wherein each of the plurality of artificial intelligence models is trained based on a plurality of groups in which a plurality of original images and a plurality of sample fake images are classified according to a pose of a face included in each of the plurality of original images and each of the plurality of sample fake images, and wherein the processor is further configured to determine a pose of a face included in the image, and identify whether the image is the fake image by inputting the image to one of the plurality of artificial intelligence models corresponding to the determined pose of the face included in the image.

In accordance with an aspect of the disclosure, there is provided an electronic device including: a display; a communication interface configured to communicate with a server; a memory storing an artificial intelligence model trained to identify a fake image, wherein the artificial intelligence model is trained based on an original image and a sample fake image including information about a landmark of a face area in each of the original image and the sample fake image; and a processor connected to the display and the communication interface, and the memory, and configured to: determine one from among the electronic device and the server is a device to identify whether an image is the fake image, based on determining that the electronic device is the device to identify whether the image is the fake image, identify whether the image is the fake image by inputting the image to the artificial intelligence model, based on determining that the server is the device to identify whether the image is the fake image, transmit the image to the server through the communication interface, and receive, from the server, a result of whether the image is the fake image, and based on the image being a fake image, display a user interface (UI) screen indicating that the image is the fake image on the display.

The artificial intelligence model is trained based on the original image in which a first pixel value of a first pixel corresponding to a first landmark in a first face area included in the original image is adjusted to a first predetermined pixel value, and based on the sample fake image in which a second pixel value of a second pixel corresponding to a second landmark in a second face area included in the sample fake image is adjusted to a second predetermined pixel value.

The processor may be further configured to determine one from among the electronic device and the server is the device to identify whether the image is the fake image, based on a user command, a network state of the electronic device, a size of the image, a type of the image, a size of the face area included in the image, or a number of face areas.

The processor may be further configured to, based on the user command indicating the device is the electronic device, determine that the electronic device is the device to identify whether the image is the fake image, and based the user command indicating the device is the server, determine that the server is the device to identify whether the image is the fake image.

The processor may be further configured to access a look-up table stored in the memory to determine one from among the electronic device and the server is the device to identify whether the image is the fake image, the look-up table storing at least one of the network state of the electronic device, the size of the image, the type of the image, the size of the face area included in the image, and the number of face areas.

The artificial intelligence model stored in the memory is an artificial intelligence model stored in the server that is compressed.

In accordance with an aspect of the disclosure, there is provided a method of controlling a server, including: inputting an image to an artificial intelligence model trained to identify a fake image; and identifying whether the image is the fake image based on an output value of the artificial intelligence model, wherein the artificial intelligence model is a model trained based on an original image and a sample fake image, each including information about a landmark of each of a face area.

The artificial intelligence model is trained based on the original image in which a first pixel value of a first pixel corresponding to a first landmark in a first face area included in the original image is adjusted to a first predetermined pixel value and based on the sample fake image in which a second pixel value of a second pixel corresponding to a second landmark in a second face area included in the sample fake image is adjusted to a second predetermined pixel value.

The artificial intelligence model is trained based on at least one of a range of a color value of the face area included in each of a plurality of original images and a plurality of sample fake images, and a difference in a brightness value between a forehead area of the face area and a cheek area in the face area.

The artificial intelligence model is one of a plurality of artificial intelligence models stored in the server, wherein each of the plurality of artificial intelligence models is trained based on a plurality of groups in which a plurality of original images and a plurality of sample fake images are classified according to a pose of a face included in each of the plurality of original images and each of the plurality of sample fake images, and wherein the inputting further includes determining a pose of a face included in the image and inputting the image to one of the plurality of artificial intelligence models, corresponding to the determined pose of the face included in the image.

In accordance with an aspect of the disclosure, there is provided a method of controlling an electronic device storing an artificial intelligence model trained to identify a fake image, the method including: determining one from among the electronic device and a server is a device to identify whether an image is the fake image; based on determining that the electronic device is the device to identify whether the image is the fake image, identifying whether the image is the fake image by inputting the image to the artificial intelligence model stored in the electronic device; based on determining that the server is the device to identify whether the image is the fake image, transmitting the image to the server through a communication interface of the electronic device, and receiving, from the server, a result of whether the image is the fake image; and based on the image being the fake image, displaying a user interface (UI) screen indicating that the image is the fake image, wherein the artificial intelligence model is a model trained based on an original image and a sample fake image, each including information about a landmark of each of a face area.

According to various embodiments as described above, a fake image may be identified more accurately.

BRIEF DESCRIPTION OF THE DRAWINGS

The above and other aspects, features and advantages of certain embodiments of the disclosure will be more apparent from the following description taken in conjunction with the accompanying drawings, in which.

DETAILED DESCRIPTION

Figure 1:
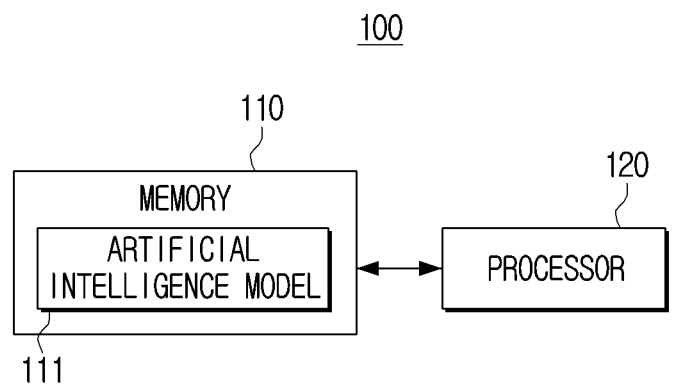
FIG. 1 is a block diagram illustrating a configuration of a server according to an embodiment of the disclosure.

Hereinafter, various embodiments of the disclosure will be described with reference to the accompanying drawings. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements throughout the disclosure.

In the disclosure, expressions such as "have," "may have," "include," "may include" or the like represent presence of a corresponding feature (for example, components such as numbers, functions, operations, or parts) and does not exclude the presence of additional feature.

In the disclosure, expressions such as "A or B," "at least one of A or/and B," or "one or more of A or/and B" may include all possible combinations of the items that are enumerated together. For example, the term "at least one of A [or/and] B" means (1) including at least one A, (2) including at least one B, or (3) including both at least one A and at least one B.

As used herein, the terms "first," "second," or the like may denote various components, regardless of order and/or importance, and may be used to distinguish one component from another, and does not limit the components.

If a certain element (e.g., first element) is described as "operatively or communicatively coupled with/to" or "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

The term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

FIG. 1 is a block diagram illustrating a configuration of a server according to an embodiment of the disclosure.

Referring to FIG. 1, a server 100 may include a memory 110 and a processor 120.

The memory 110 may store various instructions, programs, or data related to an operation of the server 100.

The memory 110 may be implemented as a non-volatile memory, a volatile memory, a flash-memory, a hard disk drive (HDD), or a solid state drive (SSD). The memory 110 may be accessed by the processor 120, and the processor 120 may be configured to perform reading/writing/modifying/deleting/updating of data on the memory 110.

In the disclosure, the term memory may include the memory 110, a read-only memory (ROM), a random access memory (RAM) in the processor 120, or a memory card mounted on the server 100.

The memory 110 may store an artificial intelligence model 111 trained to identify a fake image.

The fake image may mean a photo or a moving image (video) in which the face or face areas such as eyes, nose, mouth, etc. in the original image are synthesized with another person's face or face area. Such a fake image may be generated by a variety of deep learning image synthesis technologies such as Deepfake, FaceSwap, Face2Face, or the like.

The processor 120 may be connected to the memory 110 to control the server 100. The processor 120 may be electrically connected to the memory 110 to control the overall operation and function of the server 100.

The processor 120 may include a central processing unit (CPU) or an application processor (AP), and may execute one or more software programs stored in the memory 110 according to one or more instructions stored in the memory 110.

The processor 120 may input the image to the artificial intelligence model 111 to identify whether the image is a fake image.

Here, the artificial intelligence model 111 may be a model trained based on original images and fake images.

When an original image is input, the artificial intelligence model 111 may be trained such that a probability value output from the artificial intelligence model 111, that is, a probability value indicating that the input image is an original image is greater than or equal to a predetermined threshold value. When the fake image is input, the artificial intelligence model 111 may be trained such that a probability value output from the artificial intelligence model 111, that is, a probability value indicating that the input image is a fake image is greater than or equal to a predetermined threshold value.

The original images and the fake images may be images including information about landmark, respectively.

The artificial intelligence model 111 may be a model trained based on original images and fake images including information on landmarks of the face area, respectively.

The landmark may refer to a feature point of the face, and may include eyes, nose, mouth, a chin line, eyebrow, and the like.

The information on the landmark may mean that a pixel value of a pixel corresponding to the landmark is adjusted (or set) so that the pixel value of the pixel corresponding to the landmark in the face area has a predetermined pixel value.

The predetermined pixel value may be red, green, blue (R, G, B) pixel values represented in 256 color bitmap (e.g., (255, 0, 0) for red, (0, 255, 0) for green and (0, 0, 255) for blue). However, this is merely an example, and a predetermined pixel value may have various pixel values for each R, G, and B pixels.

The artificial intelligence model 111 may be a model trained on the basis of the original images in which a pixel value of a pixel corresponding to the landmark in the face area included in each of the original images is adjusted to a predetermined pixel value, and fake images in which a pixel value of a pixel corresponding to the landmark in the face area included in each of the fake images is adjusted to a predetermined pixel value.

Figure 2A:
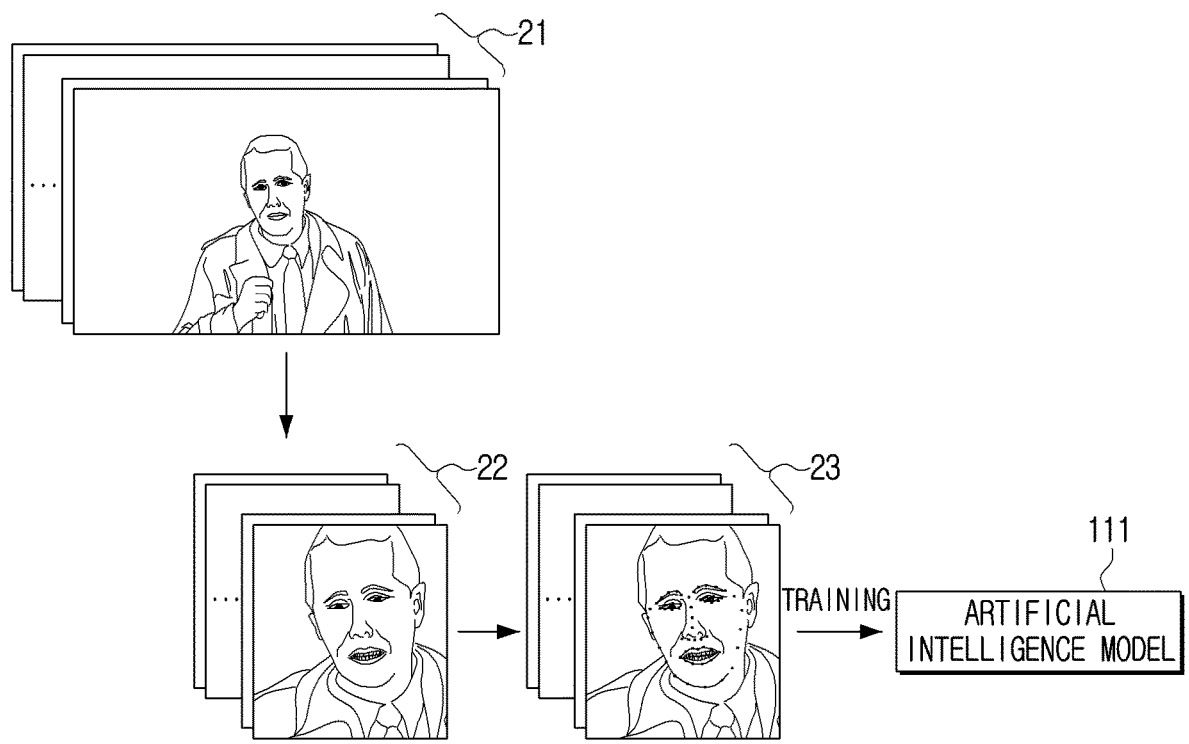
FIGS. 2A and 2B are diagrams illustrating a method for training an artificial intelligence model according to an embodiment of the disclosure.

For example, as shown in FIG. 2A, face areas 22 may be detected in original images 21, and pixel values of pixels including landmarks in each of face areas 22 may be adjusted to a predetermined pixel value. The artificial intelligence model 111 may be trained by the original images 23 whose pixel values are adjusted.

Figure 2B:
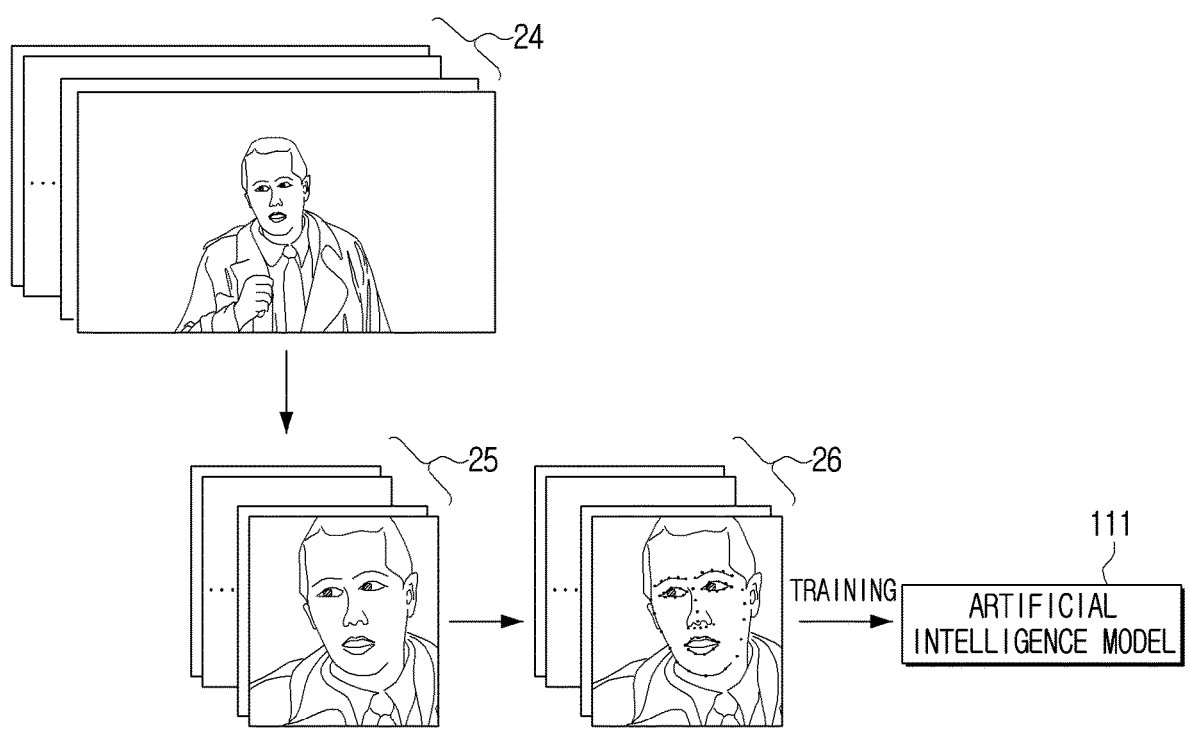

As shown in FIG. 2B, face areas 25 may be detected in fake images 24, and pixel values of pixels including landmarks in each of the face areas 25 may be adjusted to a predetermined pixel value. The artificial intelligence model 111 may be trained by the fake images 26 in which the pixel value is adjusted.

According to an embodiment, a position detected as the landmark point in the face area may include a boundary portion of the synthesized area in the fake image. When the artificial intelligence model is trained using images in which the pixel values of the pixels that are adjusted at the landmark point, the artificial intelligence model may more accurately identify the fake image with fewer training data.

A method of generating original images and fake images including information about the landmark is as shown below.

For example, a face area may be detected in each of the original images and the fake images through a face detection algorithm, and specific points (e.g., edge of the eyes, the edge of the inner eyebrow, bridge of the nose, the edge of the end of the nose, chin line, or the like) corresponding to the landmark in the face area may be detected through an algorithm such as face landmark estimation. An image including information on a landmark may be generated by adjusting a pixel value of pixels including points detected in each of the original images and the fake images to a predetermined value.

According to an embodiment, the artificial intelligence model 111 may be trained based on data obtained from these images as well as original images and fake images including information on landmarks.

The artificial intelligence model 111 may be trained based on at least one of the range of the color value of the face area included in each of the original images and the fake images and the difference in brightness between the forehead area and the cheek area included in the face area.

First, the artificial intelligence model 111 may be a model trained based on the original images, the fake images, and data for a range of color values of the face area included in each of the images.

The color value may be a hue value defined in a hue, saturation, value (HSV) color space, and the range of color values may include a minimum value and a maximum value of the color values of the pixels included in the face area.

Figure 3A:
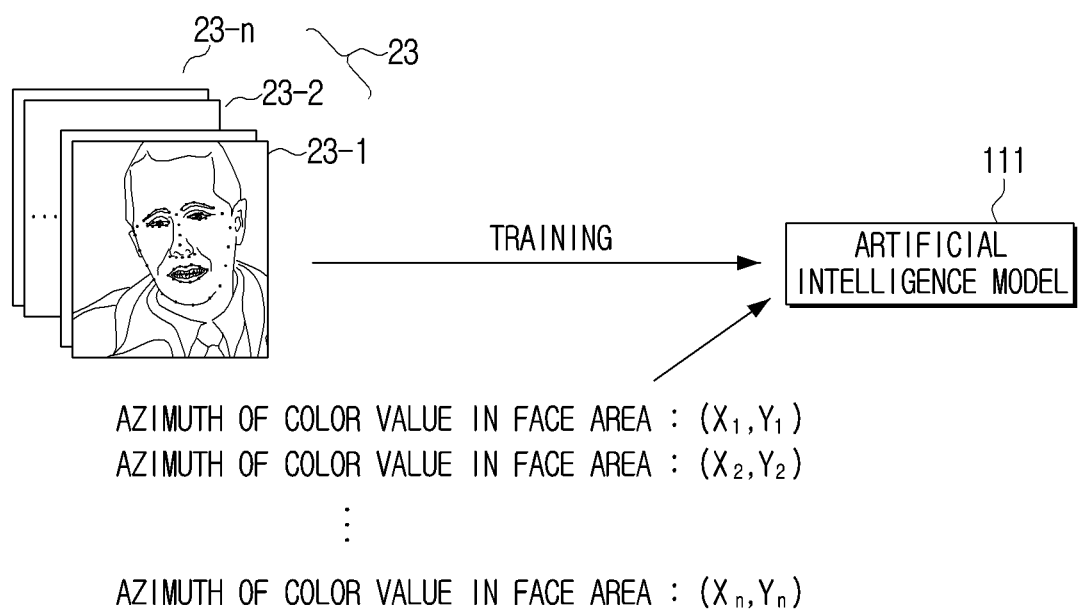
FIGS. 3A and 3B are diagrams illustrating a method for training an artificial intelligence model according to an embodiment of the disclosure.

Accordingly, as shown in FIG. 3A, the artificial intelligence model 111 may be trained based on an original image 23-1 including information about the landmark and data ($x_1$, $y_1$) about the minimum color value and the maximum color value obtained from the face area of the original image 23-1, trained based on an original image 23-2 including information about the landmark and data ($x_2$, $y_2$) about the minimum color value and the maximum color value obtained from the face area of the original image 23-2, and trained based on an original image 23-$n$ including information about the landmark and data ($x_n$, $y_n$) about the minimum color value and the maximum color value obtained from the face area of the original image 23-$n$.

Figure 3B:
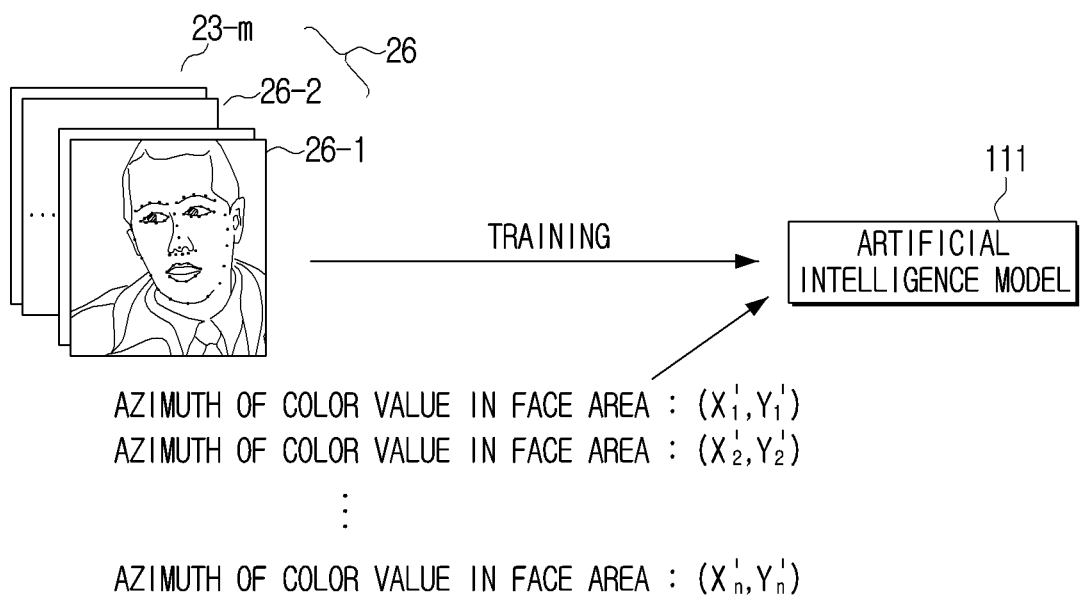

As shown in FIG. 3B, the artificial intelligence model 111 may be trained based on a fake image 26-1 including information about the landmark and data ($x'_1$, $y'_1$) about the minimum color value and the maximum color value obtained from the face area of the fake image 26-1, trained based on a fake image 26-2 including information about the landmark and data ($x'_2$, $y'_2$) about the minimum color value and the maximum color value obtained from the face area of the fake image 26-2, and trained based on a fake image 26-$m$ including information about the landmark and data ($x'_m$, $y'_m$) about the minimum color value and the maximum color value obtained from the face area of the fake image 23-$m$ (here, n and m may be identical or different).

According to an embodiment, a fake image may be generated by synthesizing a face portion below eyebrow in an original image, and the synthesized portion of the fake image may have a difference from the original image in a skin color. Thus, by training an artificial intelligence model using data on the range of the facial skin color of each of the original images and the fake images, the artificial intelligence model may more accurately identify the fake image.

A method of determining the color value of the face area and the range of the color value is as shown below.

For example, a face area may be detected in each of the original images and the fake images through a face detection algorithm, and a color value in the HSV color space of each pixel included in the face area may be determined according to the R, G, and B pixel values of the pixels included in the detected face area. A minimum value and a maximum value of the color values of the pixels included in the face area may be determined as a range of color values.

The artificial intelligence model 111 may be a model trained on the basis of the original images, the fake images, and the data on the difference of the brightness value between the forehead area and the cheek area detected in the face area included in each of the images.

The forehead area may be an area located above the eyebrow on the face, and the cheek area may be an area located at both sides of the nose on the face. The difference between the brightness values may be a difference between the brightness value of the forehead area and the brightness value of any one of the two cheek areas.

Figure 4A:
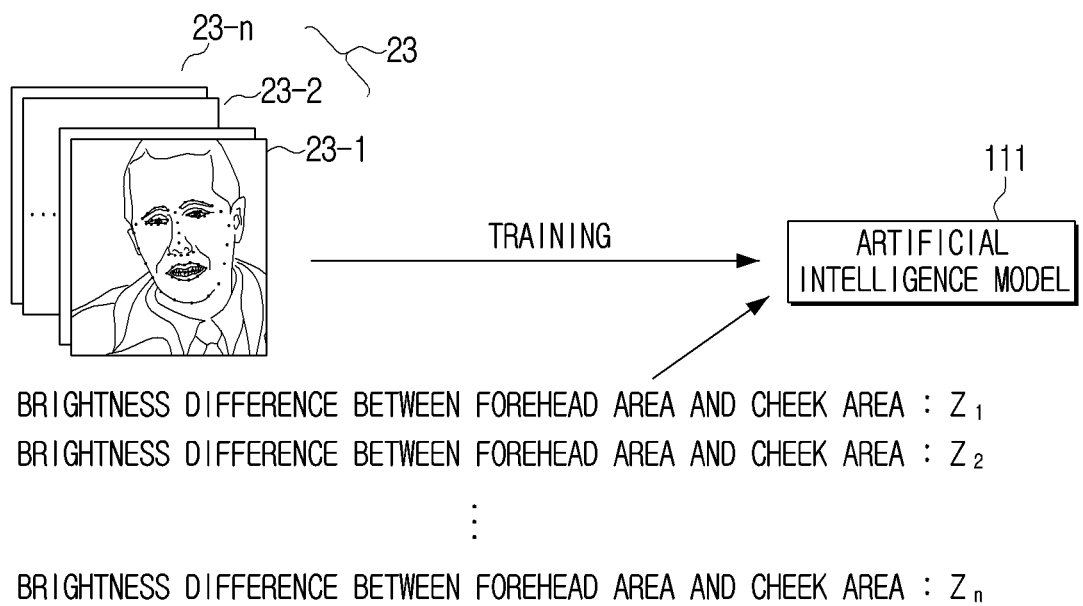
FIGS. 4A and 4B are diagrams illustrating a method for training an artificial intelligence model according to an embodiment of the disclosure.

For example, as illustrated in FIG. 4A, the artificial intelligence model 111 may be trained based on the original image 23-1 including information about the landmark and the data (e.g., $z_1$) for the difference of brightness value obtained from the face area of the original image 23-1, based on the original image 23-2 including information about the landmark and the data (e.g., $z_2$) for the difference in brightness value obtained from the face area of the original image 23-2 and based on the original image 23-$n$ including information about the landmark and the data (e.g., $z_n$) for the difference in brightness value obtained from the face area of the original image 23-$n$.

Figure 4B:
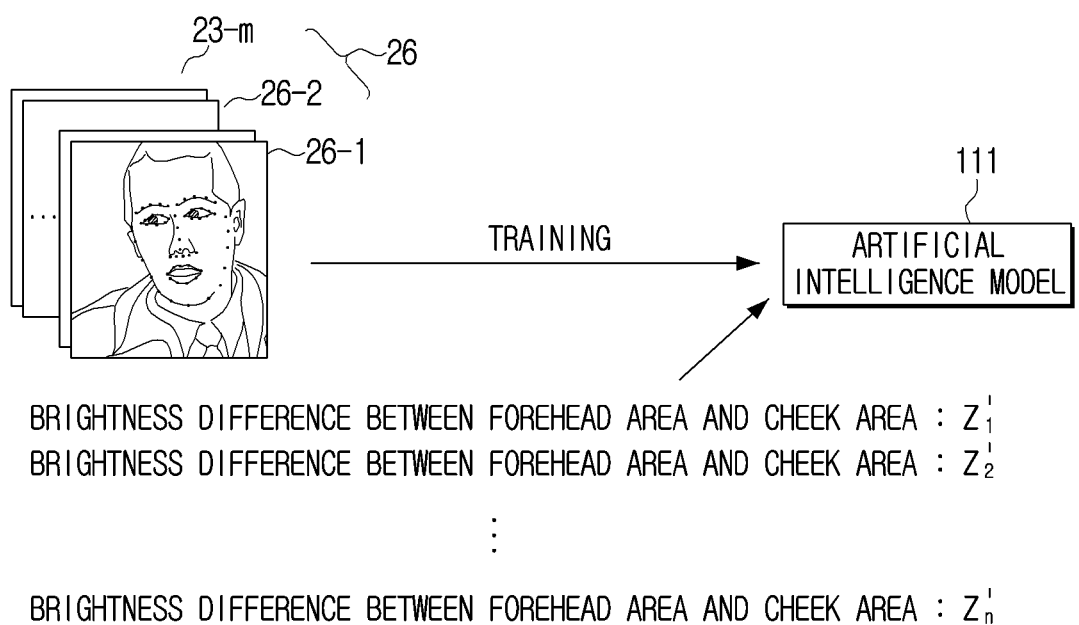

As shown in FIG. 4B, the artificial intelligence model 111 may be trained based on the fake image 23-1 including information about the landmark and the data (e.g., $z'_1$) for the difference of brightness value obtained from the face area of the fake image 26-1, trained based on the fake image 26-2 including information about the landmark and the data (e.g., $z'_2$) for the difference in brightness value obtained from the face area of the fake image 26-2 and trained based on the original image 26-$m$ including information about the landmark and the data (e.g., $z'_m$) for the difference in brightness value obtained from the face area of the original image 26-$m$.

According to an embodiment, a fake image may be generated generally by synthesizing the face portion below the eyebrow portion in the original image, and the synthesized portion in the fake image may have brightness difference from the original image. Thus, when training an artificial intelligence model using data on the difference between the brightness values of the face areas of each of the original images and the fake images, the artificial intelligence model may more accurately identify the fake image.

A method of determining the brightness difference between the forehead area and the cheek area in the face area is as shown below.

For example, a forehead area and a cheek area may be detected in the face area of each of the original images and the fake images through a face detection algorithm. The brightness value of the forehead area may be calculated as an average of R, G, and B pixel values of the pixels included in the forehead area, and the brightness value of the cheek area may be calculated as an average of R, G, and B pixel values of the pixels included in the cheek area. Accordingly, a difference between the calculated brightness values may be calculated to calculate a difference between brightness values between the forehead area and the cheek area.

Referring to FIGS. 3A-3B and FIGS. 4A-4B, it has been described that the artificial intelligence model 111 is trained by individually using data about the range of the color values of the face area and the brightness value between the forehead area and the cheek area, but this is merely an example. The artificial intelligence model may be trained based on other features of a face and/or a combination of features in a face.

The artificial intelligence model 111 may be a model trained on the basis of the original images, the fake images, the data for the range of the color values of the face area included in each of the images, and the difference of the brightness value between the forehead area and the cheek area detected in the face area included in each of the images.

The artificial intelligence model 111 may be trained based on artifact data of each of the original images and the fake images, as well as data on the range of the color value of the face area and the brightness value between the forehead area and the cheek area.

According to an embodiment, the memory 110 may store a plurality of artificial intelligence models.

Figure 5:
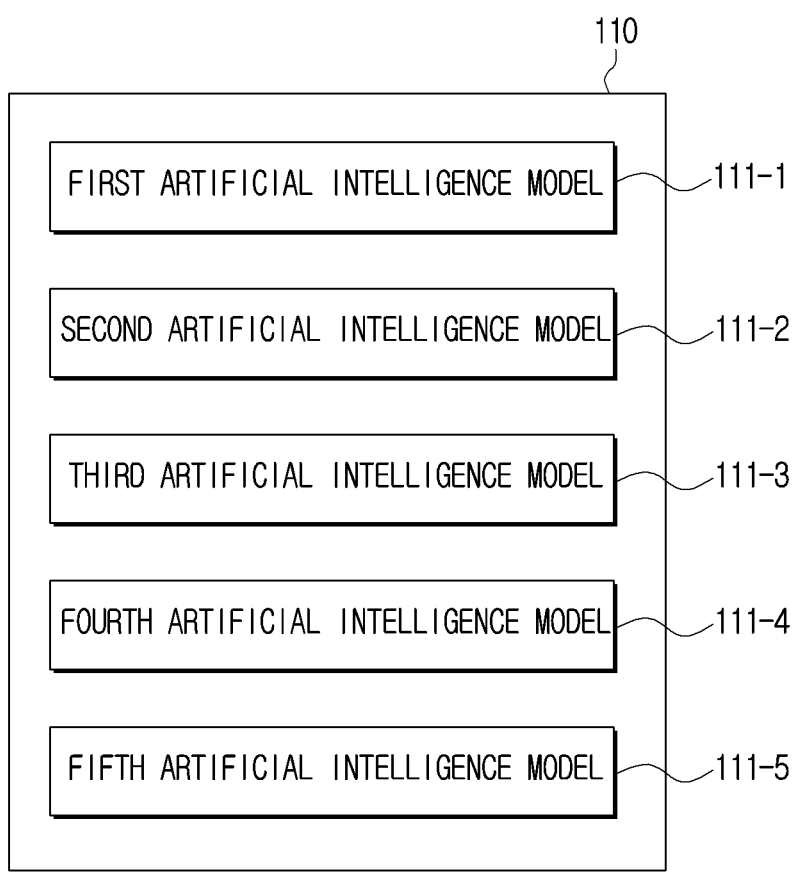
FIG. 5 is a diagram illustrating an example of an artificial intelligence model according to an embodiment of the disclosure.

For example, as illustrated in FIG. 5, a first artificial intelligence model 111-1 to a fifth artificial intelligence model 111-5 (hereinafter, referred to as "first" to fifth artificial intelligence model 111-1 to 111-5) may be stored in the memory 110.

Each of the first to fifth artificial intelligence models 111-1 to 111-5 may be a model trained by images included in each of the plurality of groups in which the original images and the fake images are classified according to the pose of the face included in the image.

For example, the original images and the fake images may be classified into five groups according to the direction which the face included in each of the original images and the fake images faces.

Specifically, the original images and fake images may be classified into a first group including the image of the face looking in the front direction, a second group including the image of the face looking in the right direction, a third group including the image of the face looking in the left direction, a fourth group including the image of the face looking in the upper direction, and a fifth group including the image of the face looking in the lower direction.

The method of classifying images according to the direction which the face faces is as shown below.

For example, for each of the original images and fake images, the roll angle (($\varphi$), pitch angle ($\theta$) and yaw angle ($\Psi$) of the face included in each image may be detected, and the direction which the face is faced at in each image may be determined based on the angle detected roll angle, pitch angle and yaw angle.

Figure 6:
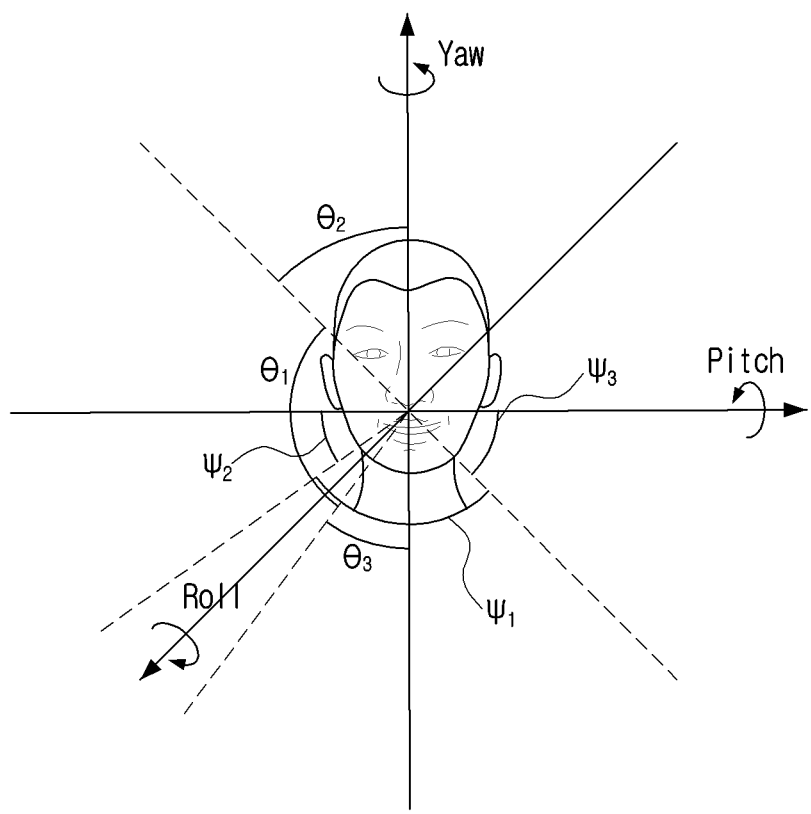
FIG. 6 is a diagram illustrating a method of determining a pose of a face according to an embodiment of the disclosure.

For example, referring to FIG. 6, when the pitch angle of the face detected from the image is within the X$\theta$1 and the yaw angle is within the $\Psi$1, the corresponding image may be classified as an image facing the front direction.

When the pitch angle of the face detected from the image is within the $\theta_1$ and the yaw angle is within the $\Psi_2$, the corresponding image may be classified as an image facing the right direction. In addition, when the pitch angle of the face detected in the image is within the $\theta$1 and the yaw angle is within the $\Psi_3$, the corresponding image may be classified as an image facing the left direction.

In addition, if the pitch angle of the face detected in the image is within the range of $\theta_2$, the image may be classified as an image facing the upper direction of the face. If the pitch angle of the face detected in the image is within the range of $\theta_3$, the image may be classified as an image facing the lower direction of the face.

According to the methods above, the original images and the fake images may be classified into five groups according to the pose of the face.

Each of the first to fifth artificial intelligence models 111-1 to 111-5 may be a model trained by images included in each group.

Figure 7A:
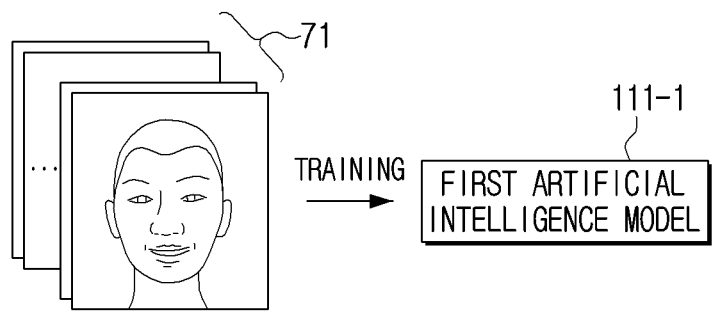
FIGS. 7A to 7E are diagrams illustrating a method for training an artificial intelligence model according to an embodiment of the disclosure.

For example, as shown in FIG. 7A, a first artificial intelligence model 111-1 may be a model trained by original images and fake images 71 in which the face faces the front direction.

Figure 7B:
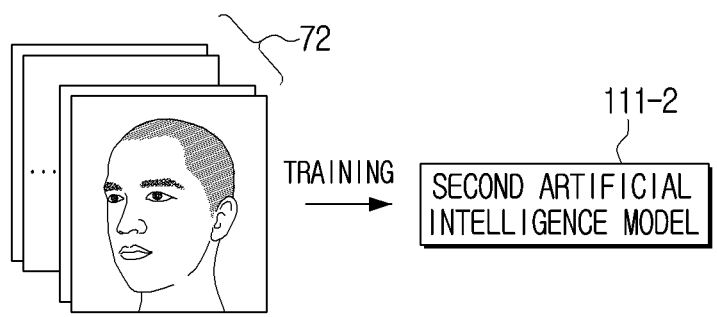

As illustrated in FIG. 7B, a second artificial intelligence model 111-2 may be a model trained by original images in which the face faces right direction and fake images 72.

Figure 7C:
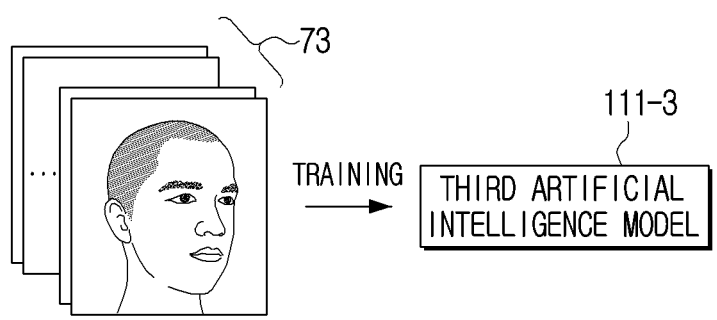

As illustrated in FIG. 7C, a third artificial intelligence model 111-3 may be a model trained by original images in which the face faces left direction and fake images 73.

Figure 7D:
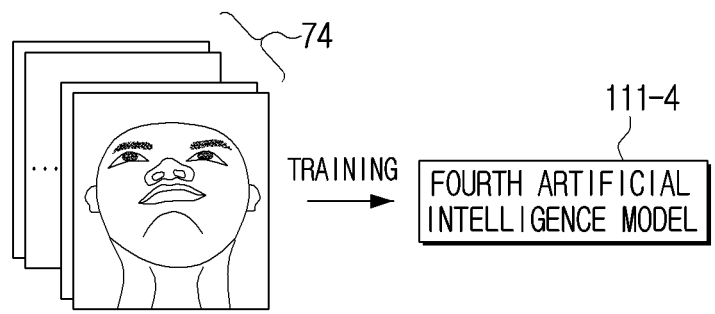

As illustrated in FIG. 7D, a fourth artificial intelligence model 111-r may be a model trained by original images in which the face faces upper direction and fake images 74.

Figure 7E:
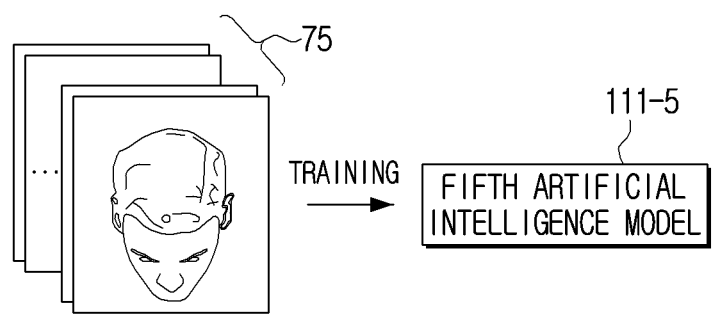

As illustrated in FIG. 7E, a fifth artificial intelligence model 111-5 may be a model trained by original images in which the face faces lower direction and fake images 75.

The images included in each group may be images including information about the landmark.

Each of the first to fifth artificial intelligence models 111-1 to 111-5 may be a model trained by at least one of data on a range of color values of a face area obtained from images included in each group, and data on a brightness difference between the forehead area and the cheek area images included in each group, and images included in each group.

Each of the first to fifth artificial intelligence models 111-1 to 111-5 may be trained based on artifact data obtained from images included in each group.

As described above, according to an embodiment, the plurality of artificial intelligence models may be models trained by images classified according to the pose of the face. Accordingly, when identifying whether the image is a fake image by selectively using these models according to the pose of the face included in the image, the accuracy of the identification may be improved.

The processor 120 may identify whether the image is a fake image by inputting an image to the artificial intelligence model 111.

The image may be an image received from the electronic device 200. Alternatively or additionally, the processor 120 may access a web page using a uniform resource locator (URL) received from the electronic device 200, and receive an image from a server providing a web page.

The processor 120 may input the image to the artificial intelligence model 111 and identify whether the input image is an original image or a fake image based on the probability value output from the artificial intelligence model 111.

The processor 120 may determine that the input image is an original image when a probability value indicating that the image is an original image is equal to or greater than a first predetermined threshold value output from the artificial intelligence model 111. The processor 120 may determine that the input image is a fake image when the probability value indicating that the image is a fake image is equal to or greater than a second predetermined threshold value output from the artificial intelligence model 111. Additionally or alternatively, the processor 120 may determine that the input image is a fake image when the probability value indicating that the image is an original image is less than the first predetermined threshold value output from the artificial intelligence model 111.

The processor 120 may input various data, other than an image, obtained from the image in addition to the image into the artificial intelligence model 111 according to the artificial intelligence model 111.

For example, if the artificial intelligence model 111 is a model trained based on original images and fake images including information about the landmark, the processor 120 may input the image into the artificial intelligence model 111.

As another example, when the artificial intelligence model 111 is a model trained based on original images including information about the landmark, the fake images including information about the landmark and data on the range of the color values of the face area included in each of the images, the processor 120 may input the images and data for the range of the color values of the face area obtained from the image into the artificial intelligence model 111.

The processor 120 may detect a face area from an image by using a face detection algorithm, or the like, and may determine a color value in the HSV color space of each pixel included in the face area by using R, G, and B pixel values of the pixels included in the detected face area. The processor 120 may determine a minimum value and a maximum value among color values of pixels included in the face area, and determine a range of color values of the face area included in the image.

As another example, when the artificial intelligence model 111 is a model trained based on data on the original images including information about the landmark, the fake images including information about the landmark, and the data on the difference of brightness between the forehead area and the cheek area included in each of the images, the processor 120 may input the image and the data on the brightness difference between the forehead area and the cheek area obtained from the image into the artificial intelligence model 111.

The processor 120 may detect a face area from an image by using a face detection algorithm, and determine a forehead area and a cheek area in a face area. For example, the processor 120 may determine an area located above the eyebrow from the face as a forehead area, and determine an area located at both sides of the nose on the face as a cheek area.

The processor 120 may calculate an average of R, G, and B pixel values of pixels included in the area to determine a brightness value of the forehead area, calculate an average of R, G, and B pixel values of the pixels included in the cheek area to determine a brightness value of the cheek area, and calculate a difference between the brightness values to determine a difference in brightness values between the forehead area and the cheek area. In this case, the processor 120 may calculate a difference between the brightness value of the forehead area and the brightness value of any one of the two cheek areas.

As another example, when the artificial intelligence model 111 is a model trained based on the original images including information about the landmark, fake images including information, data on a range of a color value of the face area included in each of the images, the data on the brightness value difference between the forehead area and the cheek area included in each of the images, the processor 120 may input the images, the data on the range of the color value of the face area included in the image and the data on brightness value difference between the forehead area and the cheek area detected in the face area to the artificial intelligence model 111.

As another example, when the artificial intelligence model 111 is trained based on the artifact data of each of the original images and the fake images, the processor 120 may input the artifact data obtained from the image to the artificial intelligence model 111 in addition to the data described above.

The processor 120 may determine the pose of the face included in the image, determine the artificial intelligence model corresponding to the determined pose among the plurality of artificial intelligence models 111-1 to 111-5, and input an image to the determined artificial intelligence model, and identify whether the image is a fake image.

The processor 120 may determine the pose of the face included in the image.

The processor 120 may detect a face area from an image by using a face detection algorithm, and detect a roll angle, a pitch angle, and a yaw angle of a face included in the face area.

The processor 120 may determine a direction which the face faces included in the image based on the detected roll angle, the pitch angle, and the yaw angle to determine the pose of the face. The method for determining a direction which the face looks at according to a roll angle, a pitch angle, and a yaw angle is described above. Therefore, repeated descriptions thereof may be omitted herein below.

The processor 120 may determine an artificial intelligence model, among the plurality of artificial intelligence models 111-1 to 111-5, trained by the original images and the fake images including the face in the same direction as the face included in the image, and input an image to the determined artificial intelligence model to identify whether the image is a fake image.

For example, when the face included in the image faces the front direction, the processor 120 may input an image to the first artificial intelligence model 111-1 among the plurality of artificial intelligence models 111-1 to 111-5.

When the face included in the image faces the right direction, the processor 120 may input an image to the second artificial intelligence model 111-2 among the plurality of artificial intelligence models 111-1 to 111-5.

When the face included in the image faces the left direction, the processor 120 may input an image to the third artificial intelligence model 111-3 among the plurality of artificial intelligence models 111-1 to 111-5.

The processor 120, when the face included in the image faces the upper direction, may input an image to the fourth artificial intelligence model 111-4 among the plurality of artificial intelligence models 111-1 to 111-5.

When the face included in the image faces the downward direction, the processor 120 may input an image to the fifth artificial intelligence model 111-5 among the plurality of artificial intelligence models 111-1 to 111-5.

The processor 120 may input not only images but also data obtained from the image (e.g., data on a range of a color value of a face area, data on a brightness difference between the forehead area and a cheek area) to an artificial intelligence model corresponding to the face pose of the image, according to the training data used for training of the plurality of artificial intelligence models 111-1 to 111-5.

As described above, the processor 120 may identify whether the image is an original image or a fake image by using an artificial intelligence model 111 (or one or more artificial intelligence models among the plurality of artificial intelligence models 111-1 to 111-5).

According to an embodiment, the processor 120 may identify whether the image is an original image or a fake image by using at least two of the plurality of artificial intelligence models 111-1 to 111-5.

The processor 120 may input an image into at least two artificial intelligence models among the plurality of artificial intelligence models 111-1 to 111-5, and may identify whether the image is an original image or a fake image by using a probability value output from each of the artificial intelligence models.

The processor 120 may determine at least two artificial intelligence models to which the image is to be input, according to the direction which the face looks at included in the image faces.

For example, when the pitch angle of the face detected from the image is in the range of $\theta_2$ and the yaw angle is in the range of $\Psi_2$, the processor 120 may determine that the face faces the right upper direction, identify that the second artificial intelligence model 111-2 and the fourth artificial intelligence model 111-4 among the plurality of artificial intelligence models 111-1 to 111-5 are an artificial intelligence model to which the image is input, and input an image to the second and fourth artificial intelligence models 111-2 and 111-4.

As another example, when the pitch angle of the face detected from the image is in the range of $\theta_2$ and the yaw angle is in the range of $\Psi_3$, the processor 120 may determine that the face faces the left upper direction, identify that the third artificial intelligence model 111-3 and the fourth artificial intelligence model 111-4 among the plurality of artificial intelligence models 111-1 to 111-5 are an artificial intelligence model to which the image is input, and input an image to the third and fourth artificial intelligence models 111-3 and 11104.

As another example, when the pitch angle of the face detected from the image is in the range of $\theta_3$ and the yaw angle is in the range of $\Psi_2$, the processor 120 may determine that the face faces the right lower direction, identify that the second artificial intelligence model 111-2 and the fifth artificial intelligence model 111-5 among the plurality of artificial intelligence models 111-1 to 111-5 are an artificial intelligence model to which the image is input, and input an image to the second and fifth artificial intelligence models 111-2 and 111-5.

As another example, when the pitch angle of the face detected from the image is in the range of $\theta_3$ and the yaw angle is in the range of $\Psi_3$, the processor 120 may determine that the face faces the left lower direction, identify that the third artificial intelligence model 111-3 and the fifth artificial intelligence model 111-5 among the plurality of artificial intelligence models 111-1 to 111-5 are an artificial intelligence model to which the image is input, and input an image to the third and fifth artificial intelligence models 111-3 and 111-5.

The processor 120 may identify whether the image is the original image or the fake image by using the probability value output from the artificial intelligence models.

For example, the processor 120 may assign a weight to a probability value output from each of the artificial intelligence models, calculate an average value of the weighted probability values, compare the average value with a predetermined threshold value, and identify whether the image is an original image or a fake image.

As described above, when the face included in the image is analyzed based on a plurality of facing directions using respective plurality of artificial intelligence models, the accuracy of identifying the fake image may be improved.

Figure 8:
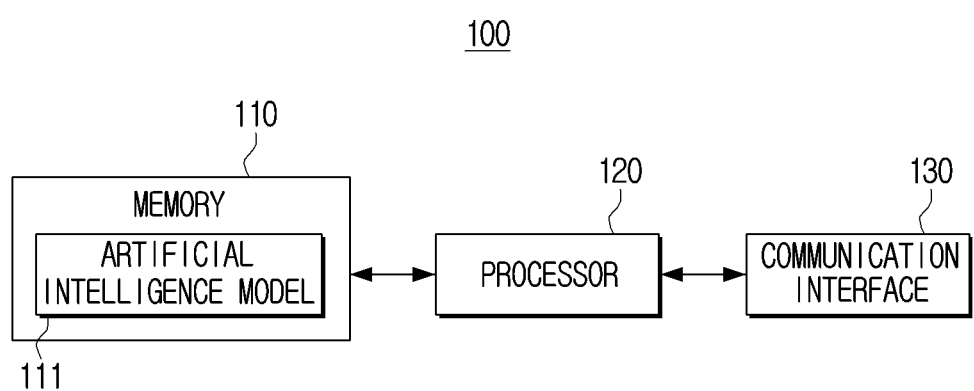
FIG. 8 is a block diagram illustrating a detailed configuration of a server according to an embodiment of the disclosure.
Figure 9:
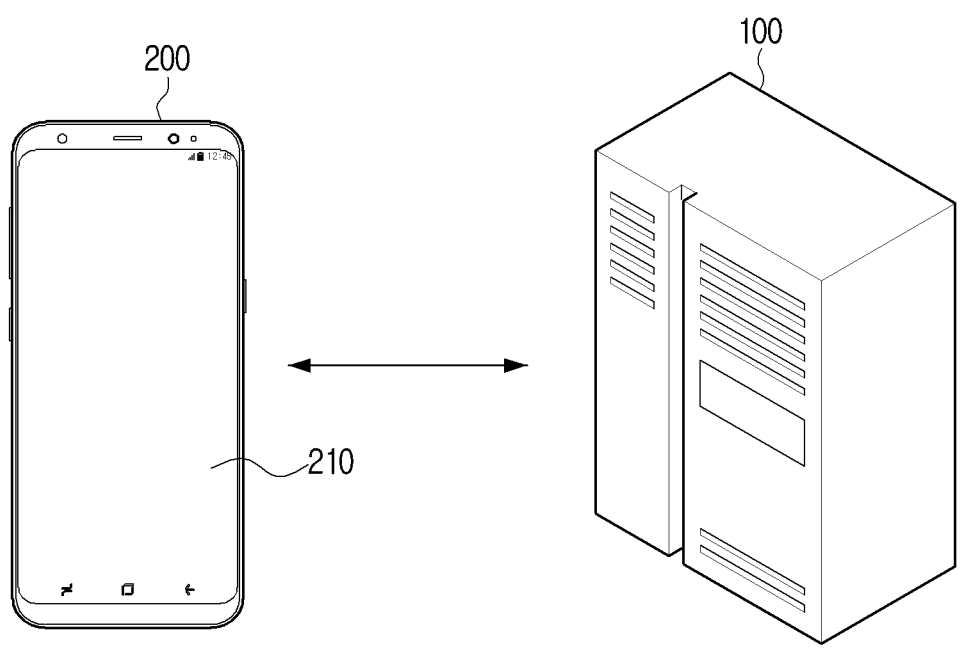
FIG. 9 is a diagram illustrating a system for identifying a fake image according to an embodiment of the disclosure.

FIG. 8 is a block diagram illustrating a detailed configuration of a server according to an embodiment of the disclosure. FIG. 9 is a diagram illustrating a system for identifying a fake image according to an embodiment of the disclosure. Referring to FIG. 8 an d9, the processor 120 of the server 100 may transmit the identification result about the fake image to the electronic device 200.

Specifically, when the processor 120 identifies that the image is an original image, the processor 120 may transmit a user interface (UI) screen including information indicating that the image is an original image to the electronic device 200, and when the image is identified as a fake image, the processor 120 may transmit a UI screen including information indicating that the image is a fake image to the electronic device 200.

The electronic device 200 may display the UI screen received from the server 100 on the display 210.

Referring to FIG. 8, the server 100 may include the memory 110, the processor 120, and the communication interface 130. The elements may be controlled by the processor 120.

The elements illustrated in FIG. 8 are examples, and at least some elements may be omitted or other elements may be added according to an embodiment.

Since the memory 110 and the processor 120 are described in FIGS. 1 to 7, a detailed description thereof will be omitted.

The communication interface 130 is configured to perform communication with an external device. For example, the communication interface 130 may communicate with the electronic device 200, another server, and the like through a network.

The communication interface 130 may include various modules for accessing to network, such as a network card or the like.

The processor 120 may receive an image from the electronic device 200 via the communication interface 130.

The processor 120 may receive information on a URL for providing an image from the electronic device 200 through the communication interface 130, access the web page through the communication interface 130 using the URL, and receive an image from a server providing a web page.

Referring to FIG. 9, a system 1000 may include the server 100 and the electronic device 200.

The server 100 has been described with reference to FIGS. 1 to 8 and will not be further described to avoid redundancy.

The electronic device 200 may receive a user command requesting identification of whether an image is a fake image.

The electronic device 200 may be implemented as a smartphone, as shown in FIG. 9. However, this is merely an example, and the electronic device 200 may be implemented as a notebook, a personal digital assistant (PDA), a media player, an MP3 player, a micro server, a global positioning system (GPS), an electronic book terminal, a digital broadcasting terminal, a kiosk, an electronic picture frame, a navigation, a wrist watch, a head-mounted display (HMD) device, other mobile or non-mobile computing devices, or the like.

When a user command is input to the electronic device 200, the electronic device 200 may determine which device between the electronic device 200 and the serve 100 is a device to identify a fake image.

If it is determined that the electronic device 200 is the device for identifying whether the image is a fake image, the electronic device 200 may identify whether the image is a fake image by using an artificial intelligence model stored in the electronic device 200, and display a UI screen including information on the identification result on the display 210 of the electronic device 200.

If it is determined that the server 100 is the device for identifying a fake image, the electronic device 200 may transmit the image to the server 100 or transmit a URL providing the image to the server 100. Accordingly, the server 100 may identify whether the image is a fake image, and transmit a UI screen including information on the identification result to the electronic device 200. The electronic device 200 may display the UI screen received from the server 100 on the display 210 of the electronic device 200.

Figure 10A:
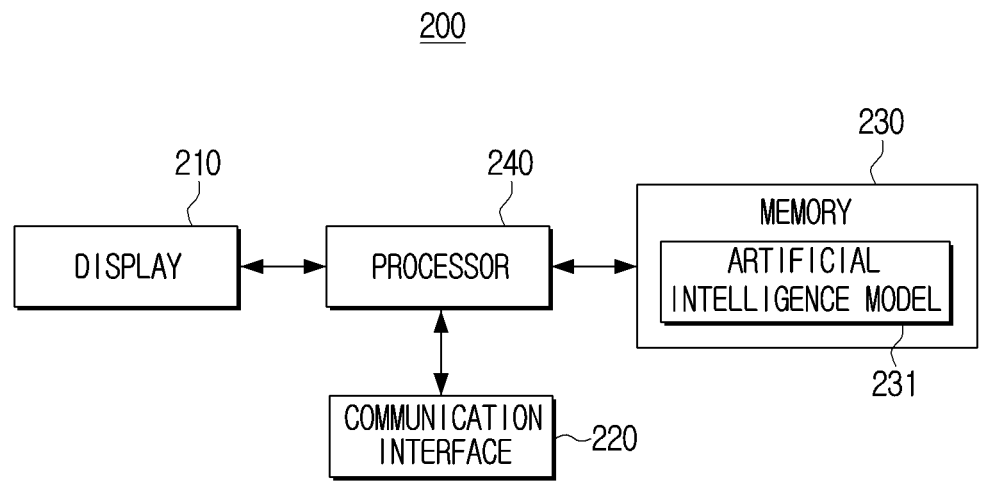
FIGS. 10A-10B are block diagrams illustrating a configuration of an electronic device according to an embodiment of the disclosure.

FIG. 10 is a block diagram illustrating a configuration of an electronic device according to an embodiment of the disclosure.

Referring to FIG. 10, the electronic device 200 may include a display 210, a communication interface 220, a memory 230, and a processor 240.

The display 210 may be of various types. For example, the display 210 may be implemented as various types of displays such as a liquid crystal display (LCD), organic light emitting diodes (OLED), active-matrix organic light-emitting diode (AM-OLED), or the like.

The display 210 may additionally include additional features in accordance with the implementation scheme. For example, when the display 210 is a liquid crystal type, the display 210 may include an LCD display panel, a backlight unit for supplying light thereto, and a panel driving substrate for driving the panel.

The display 210 may be coupled to a touch sensor to be implemented as a touch screen. Accordingly, the display 210 may receive a user command touching the display 210 and transfer the received user command to the processor 240.

The communication interface 220 is configured to communicate with an external device. For example, the communication interface 220 may communicate with a server via a network.

The server may include the server 100 that performs the identification of the fake image, and also a server that provides an image through the web page.

The communication interface 220 may include the Wi-Fi module and the mobile communication module.

The Wi-Fi module may perform communication in a Wi-Fi manner. For example, the Wi-Fi module may be connected to an access point to communicate with a server via an access point.

The mobile communication module may communicate with a server using mobile communication method such as $3^{rd}$ generation (3G), $3^{rd}$ generation partnership project (3GPP), long term evolution (LTE), $5^{th}$ generation (5G), or the like.

The memory 230 may store instructions, programs or data related to the operation of the electronic device 200.

The memory 230 may be implemented as a non-volatile memory, a volatile memory, a flash-memory, a hard disk drive (HDD), slid state drive (SSD), or the like. The memory 230 may be accessed by the processor 240, and may perform reading, recording, modifying, deleting, updating, or the like, of data by the processor 240.

In the disclosure, the term memory may include a read-only memory (ROM), a random access memory (RAM) in the processor 240, a memory card mounted to the electronic device 200, or the like.

Figure 10B:
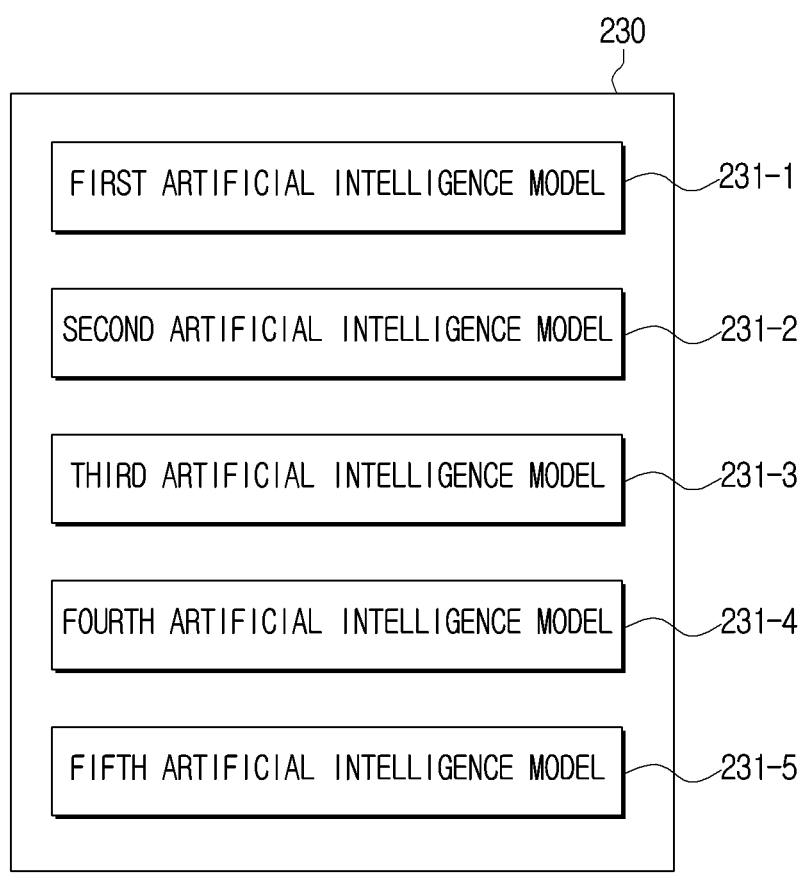

The memory 230 may store an artificial intelligence model 231 trained to identify a fake image. As shown in FIG. 10B, the memory 230 may store a plurality of artificial intelligence models 231-1 to 231-5 to identify a fake image, respectively.

The artificial intelligence model 231 (or the plurality of artificial intelligence models 231-1 to 231-5) may be in a form that the artificial intelligence model 111 (or a plurality of artificial intelligence models 111-1 to 111-5) stored in the server 100 is compressed.

For example, the artificial intelligence model 231 (or the plurality of artificial intelligence models 231-1 to 231-5) may be a model in which the artificial intelligence model 111 (or the plurality of artificial intelligence models 111-1 to 111-5) may be compressed according to a method such as pruning or quantization.

The artificial intelligence model 231 (or, a plurality of artificial intelligence models 231-1 to 231-5) may be a model having a difference only in capacity, processing speed, accuracy, or the like, with the artificial intelligence model 111 (or a plurality of artificial intelligence models 111-1 to 111-5), but is trained based on the same training data (e.g., original images and fake images including information on the landmark of the face area, data on a range of a color value of the face area, data on a difference in brightness values between the forehead area and the cheek area, data on artifacts obtained in each of the original images and the fake images).

The processor 240 may be connected to the display 210, the communication interface 220, and the memory 230, and may control overall operation and function of the electronic device 200.

The processor 240 may include a central processing unit (CPU) or an application processor (AP), and may execute one or more software programs stored in the memory 230 in accordance with one or more instructions stored in the memory 230.

The processor 240 may determine a device from among the electronic device 200 and/or the server 100 to identify a fake image.

The image may be an image stored in the memory 230. Alternatively or additionally, the processor 240 may access the web page through the communication interface 220 using the URL, and receive an image from a server providing a web page.

When a user command requesting identification of whether an image is a fake image is inputted, the processor 240 may determine which from among the electronic device 200 and the server 100 is a device to identify a fake image.

The processor 240 may determine a device to identify a fake image from among the electronic device 200 and the server 100 based on the device set according to a user command from the electronic device 200 and the server 100, a network state of the electronic device 200, a size of an image, a type of an image, a size of a face area included in the image, and the number of face areas.

When one device of the electronic device 200 and the server 100 is set as a device for identifying a fake image according to a user command, the processor 240 may determine that the device set according to the user command is a device to identify the fake image.

For example, when the device set according to the user command is the electronic device 200, the processor 240 may determine that the electronic device 200 is a device for identifying the fake image, and if the device set according to the user command is the server 100, the processor 240 may determine that the server 100 is a device for identifying the fake image.

The processor 240 may determine a device for identifying a fake image on the basis of at least one of a network state of the electronic device 100, a type of an image, a capacity of an image, a size of a face area included in the image, and the number of face areas when the device for identifying the fake image is not set according to the user command.

The memory 230 may store a look-up table (specifically, a multi-dimensional look-up table) in which the device for identifying a fake image is previously defined according to a combination of these conditions.

The processor 240 may determine a device to identify whether an image is a fake image among the electronic device 200 and the server 100 according to at least one of the network state of the electronic device 200, the size of the image, the type of the image, the size of the face area included in the image, and the number of face areas by using the lookup table stored in the memory 230.

The processor 240 may determine the network state of the electronic device 100.

The network state may include whether the communication interface 220 is activated (e.g., whether the Wi-Fi module and the mobile communication module are activated) and the network speed of the activated communication interface 220 (e.g., when the Wi-Fi module is activated, the network speed of the Wi-Fi module, and when the mobile communication module is activated, the network speed of the mobile communication module).

The processor 240 may also determine the type and capacity of the image. Here, the type of the image refers to whether the image is an image or a video, and the capacity of the image may mean a capacity of an image file or a video.

The processor 240 may obtain metadata of the image from the memory 230 or the server and determine the type and capacity of the image using the obtained metadata.

The processor 240 may detect a face area from an image by using a face detection algorithm, and determine the size and number of the detected face area.

The processor 240 may determine which is a device, among the electronic device 200 and the server 100, is a fake image according to at least one of the network state of the electronic device 100, the type of the image, the capacity of the image, the size of the face area included in the image, the size of the face area included in the image, and the number of face areas by using the lookup table.

For example, when the mobile communication module of the electronic device 200 is activated, the network speed of the mobile communication module is 10 Mbps, the image is 1 MB, and one face area having a size of 200×200 is detected in the image, and in the look-up table, the electronic device 200 is set to a device for identifying the fake image in this condition, the processor 240 may determine that the electronic device 200 is a device to identify the fake image.

As another example, when the Wi-Fi module is activated, the network speed of the Wi-Fi module is 250 Mbps, the image is a moving image of 100 Mb, the maximum size of the detected face area among the plurality of image frames constituting the video is 250×200, the maximum number of face areas detected for each image frame is 3, and in the look-up table, the server 100 is set as a device for identifying the fake image in this condition, the processor 240 may determine that the server 100 is a device for identifying the fake image.

The processor 240 may determine a device to identify a fake image from among the electronic device 200 and the server 100 by using the look-up table.

In the lookup table, it may include information about previously defined device for processing an image having characteristics according to the number and size of the face area based on the network state of the electronic device 100. The hardware system performance of the server 100 and the electronic device 200, and the performance of the artificial intelligence models 111 and 231 may be stored in each device (e.g., the server 100, the electronic device 200, and/or one or more external electronic devices).

According to an embodiment, identification of a fake image may be performed by more efficient device through the look-up table.

In the above-described example, it is described that one of the electronic device 200 and the server 100 is determined as a device for identifying a fake image according to a user command.

However, this is merely an example, and the processor 240 may determine one of the electronic device 200 and the server 100 as a device to identify a fake image according to what image is requested by a user to be identified whether the image is a fake image.

The processor 240 may determine that the electronic device 200 is a device to identify a fake image when a user command requesting identification of a fake image for the image stored in the memory 230 is received. The processor 240 may determine that the server 100 is a device to identify a fake image when a user command requesting identification of a fake image is received for an image provided through the web page.

If the electronic device 200 is determined as a device to identify a fake image, the processor 240 may input the image to the artificial intelligence model 231 to identify whether the image is a fake image. The processor 240 may display a user interface (UI) screen including information indicating that the image is an original image or a fake image on the display 210.

The method for identifying whether an image is a fake image by using an artificial intelligence model (or one artificial intelligence model of a plurality of artificial intelligence models) is the same as the description of the server 100 and a duplicate description thereof will be omitted.

If it is determined that the server 100 is determined as a device to identify a fake image, the processor 240 may transmit an image or a URL that provides an image to the server 100 through the communication interface 220.

When the UI screen including information indicating that the image is an original image or a fake image is received from the server 100 through the communication interface 220, the processor 240 may display the received UI screen on the display 210.

As described above, if it is determined that the electronic device 200 is determined as a device to identify a fake image, the processor 240 may identify whether the image is a fake image by using the artificial intelligence model 231.

If a probability value indicating that the image output from the artificial intelligence model 231 is a fake image, is greater than or equal to a first preset threshold value, the processor 240 may determine that the input image is a fake image.

In this example, according to an embodiment, the processor 240 may transmit the image to the server 100 through the communication interface 220 when the probability value indicating that the image is a fake image is within a predetermined range.

For example, a predetermined range may include 50%, and the maximum value of the predetermined range may be a value that is less than a predetermined threshold value.

For example, assume that the predetermined threshold value is 60% and the predetermined range is greater than 40% and less than 60%.

In this example, if the probability value indicating that the image output from the artificial intelligence model 231 is a fake image is 70%, the processor 240 may determine that the image is a fake image. However, the processor 240 may transmit the image to the server 100 through the communication interface 220 when the probability value indicating that the image is a fake image, output from the artificial intelligence model 231 is 55%

This is to, when the probability value output from the artificial intelligence model 231 is not greater than or equal to the predetermined threshold value, the processor 240 may determine whether an image is a fake image by the artificial intelligence model 111 having better performance than the artificial intelligence model 231.

According to an embodiment, the processor 240 may not perform a process for identifying whether the image is a fake image when the face area is not detected in the image. That is, the processor 240 may terminate the process without separately determining the device for identifying whether the image is a fake image.

In addition, even if the face area is detected in the image, the processor 240 may not perform a process of identifying whether the image is a fake image if the face area does not match the condition set according to the user command.

For example, the processor 240 may terminate the process of identifying whether the image is a fake image if the size of the face area detected in the image is greater than or equal to the maximum size set according to the user command, or if the number of face areas detected in the image is more than the maximum number set according to the user command.

When the processor 240 terminates a process for identifying whether the image is a fake image, a UI screen (e.g., a UI screen including a message such as "the image does not match the input condition, so whether it is a fake image has not been identified") indicating termination may be displayed on the display 210.

The processor 240 may perform the above operation through the application stored in the memory 230.

If a user command to execute an application to identify a fake image is input, the processor 240 may execute the application.

The user command may be a user command to select an icon on a home screen displayed on the display 210.

Figure 11:
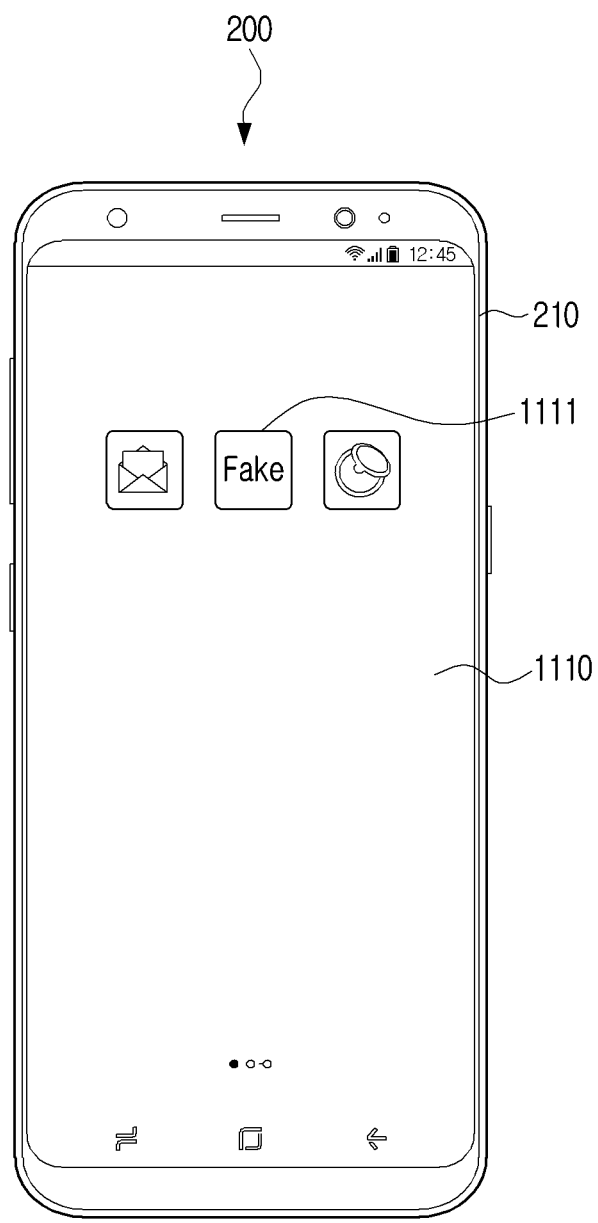
FIG. 11 is a diagram illustrating a method of executing an application for identifying a fake image according to an embodiment of the disclosure.

For example, as shown in FIG. 11, the processor 240 may display a home screen 1110 including a plurality of icons representing a plurality of applications installed in the electronic device 200 on the display 210. When a user command for selecting an icon 1111 representing an application for identifying a fake image among the plurality of icons is input, the processor 240 may execute the corresponding application.

When the application is executed, the processor 240 may receive a user command for selecting an image through the UI screen. The processor 240 may determine the image selected according to the user command as an image to be identified for a fake image.

The user may select an image among a plurality of images stored in the memory 230 or select an image provided from the web page.

Figure 12:
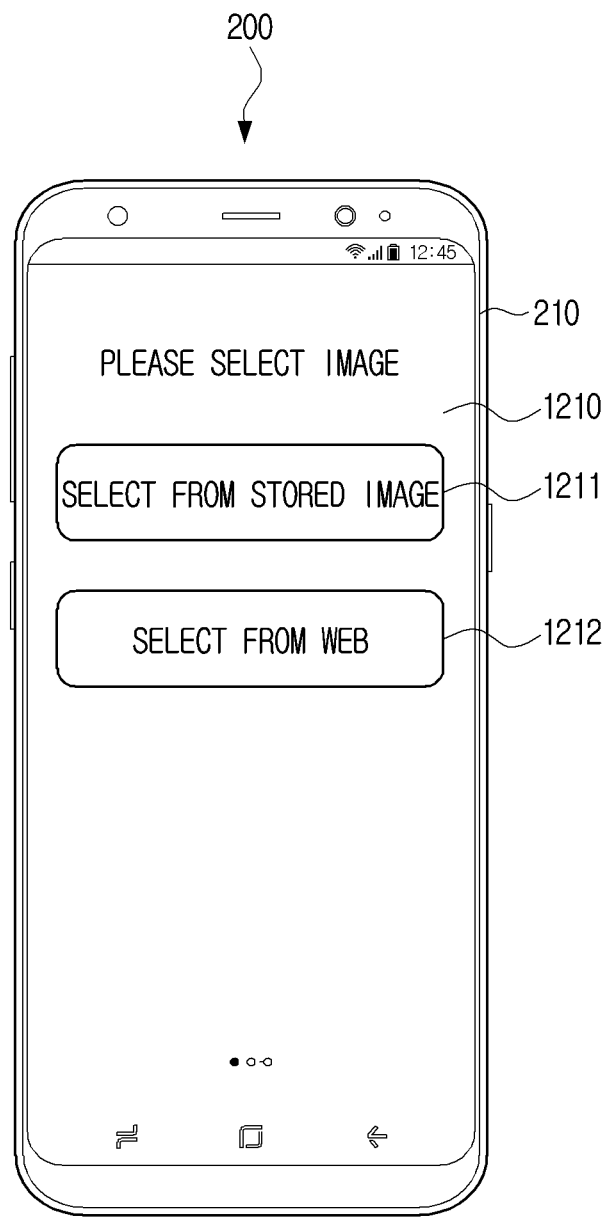
FIG. 12 is a diagram illustrating an example of a UI screen for receiving a user command for selecting an image according to an embodiment of the disclosure.

For example, the processor 240, as illustrated in FIG. 12, may display a UI screen 1210 including the UI element 1211 for selecting from the stored image and a UI element 1212 for selecting from a web page, on the display 210.

The processor 240 may display a plurality of images stored in the memory 230 on the display 210 when a user command for selecting the UI element 1211 is input. When a user command for selecting one of the plurality of images is received, the processor 240 may determine whether the selected image is a fake image.

When a user command for selecting the UI element 1212 is input, the processor 240 may access the Internet through the communication interface unit 220 and access a web page providing an image through the Internet according to a user command. When a user command for selecting a web page is input, the processor 240 may determine whether an image provided from the selected web page is a fake image.

The processor 240 may receive a user command to set a parameter through the UI screen.

The parameter may include a parameter for determining a device for identifying a fake image and a parameter for setting the number and size of the face area.

Figure 13:
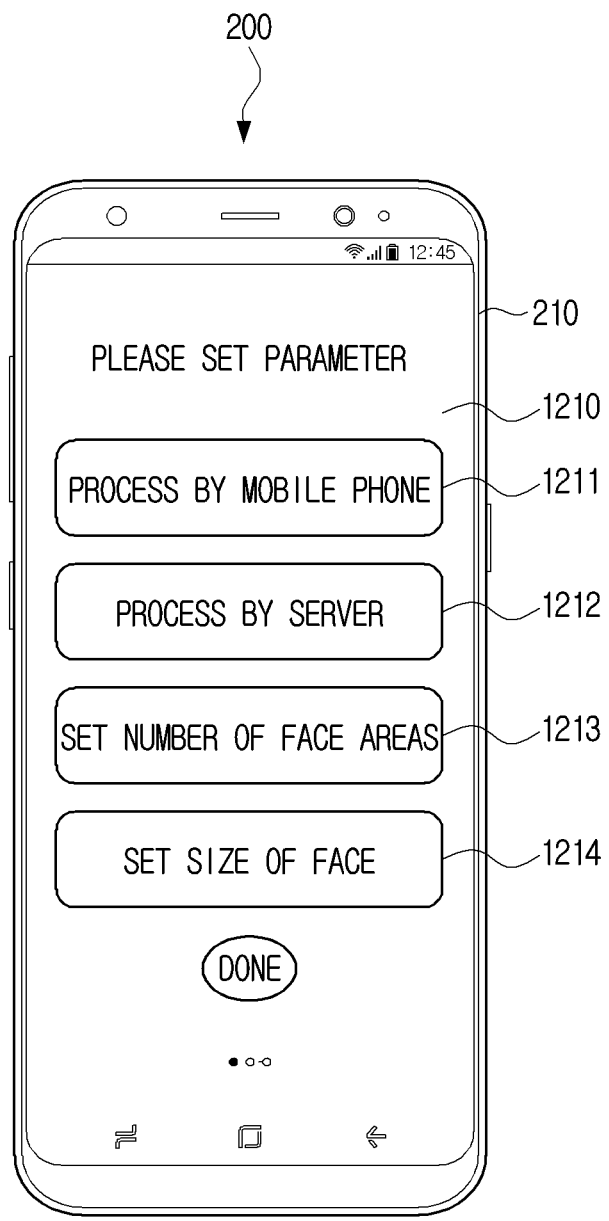
FIG. 13 is a diagram illustrating an example of a UI screen for receiving a user command for setting a device for identifying a fake image according to an embodiment of the disclosure.

As shown in FIG. 13, the processor 240 may display a UI element 1311 for setting the device for identifying the fake image to the electronic device 200, a UI component 1312 for setting the device for identifying the fake image to the server 100, a UI element 1313 for setting the number of face areas, and a UI element 1314 for setting the size of the face area, on the display 210.

For example, when a user command for selecting the UI element 1311 is input, the processor 240 may set the electronic device 200 to the device for identifying the fake image. When a user command for selecting the UI element 1312 is input, the processor 240 may set the server 100 as a device for identifying the fake image.

When a user command for selecting the UI element 1313 is input, the processor 240 may display a UI screen for setting the number of face areas on the display 210, and set the number of face areas based on the user command inputted through the UI screen.

The processor 240 may, if a user command for selecting a UI element 1314 is input, display a UI screen for setting the size of the face area on the display 210 and may set the size of the face area based on the user command input through the UI screen.

The processor 240 may determine whether the detected face area corresponds to the number and size of the face area set through the UI screen, and may not perform a process for identifying whether the image is a fake image when the number and size of the face area detected in the image do not match the set condition according to the user command.

The processor 240 may determine a device to identify a fake image.

For example, when the image stored in the memory 230 is selected through the UI screen 1210 shown in FIG. 12, the processor 240 may determine that the electronic device 200 is a device to identify the fake image, and when the image provided through the web page is selected, the processor 240 may determine that the server 100 is a device to identify the fake image.

The processor 240 may determine that the electronic device 200 is a device for identifying the fake image when the electronic device 200 is set to a device for identifying the fake image according to the user command through the UI screen 1310 shown in FIG. 13, and may determine that the server 100 is a device for identifying the fake image when the server 100 is set to a device for identifying the fake image according to the user command.

The processor 240 may determine a device, from among the electronic device 200 or the server 100, to identify a fake image based on at least one of the network state of the electronic device 200, the size of the image, the type of the image, the size of the face area included in the image, the size of the face area included in the image, and the number of face areas when the device for identifying the fake image is not set according to the user command (e.g., when the UI element 1311 and the UI element 1312 are not selected and "done" is selected in FIG. 13).

When the electronic device 200 is determined as a device to identify the fake image, the processor 240 may input the image to the artificial intelligence model 231 to identify whether the image is a fake image.

If it is identified that the image is a fake image, the processor 240 may display a UI screen indicating that the image is a fake image on the display 210.

If it is determined that the server 100 is a device to identify the fake image, the processor 240 may transmit the image selected according to a user command or a URL that provides the image to the server 100 through the communication interface 220 according to the user command.

If it is determined that the image is a fake image, the processor 240 may receive a UI indicating that the image is a fake image from the server 100 through the communication interface 220, and display the received UI screen on the display 210.

If the image is a fake image, an example of the UI screen displayed on the display 210 is as below.

Figure 14A:
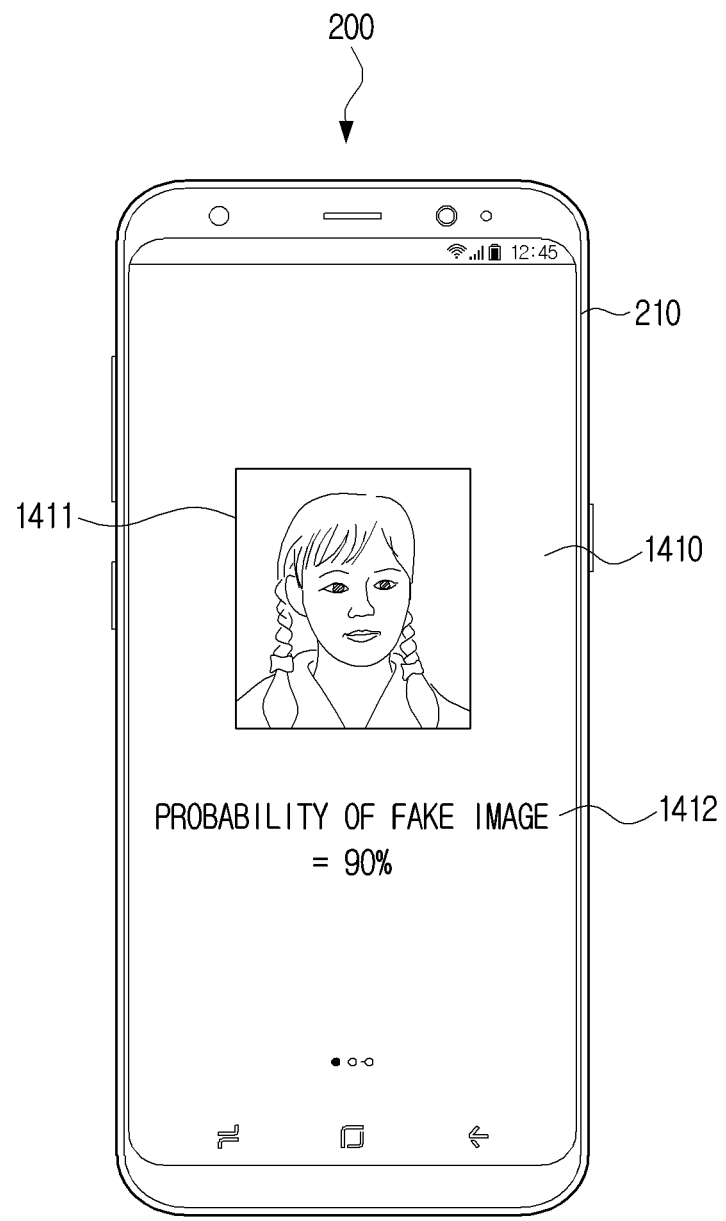
FIGS. 14A-14C are diagrams illustrating an example of a user interface provided when an image is a fake image according to an embodiment of the disclosure.

For example, as shown in FIG. 14A, the processor 240 may display the UI screen 1410 to the display 210 including the image 1411 and a probability value 1412 indicating that the image is a fake image.

Figure 14B:
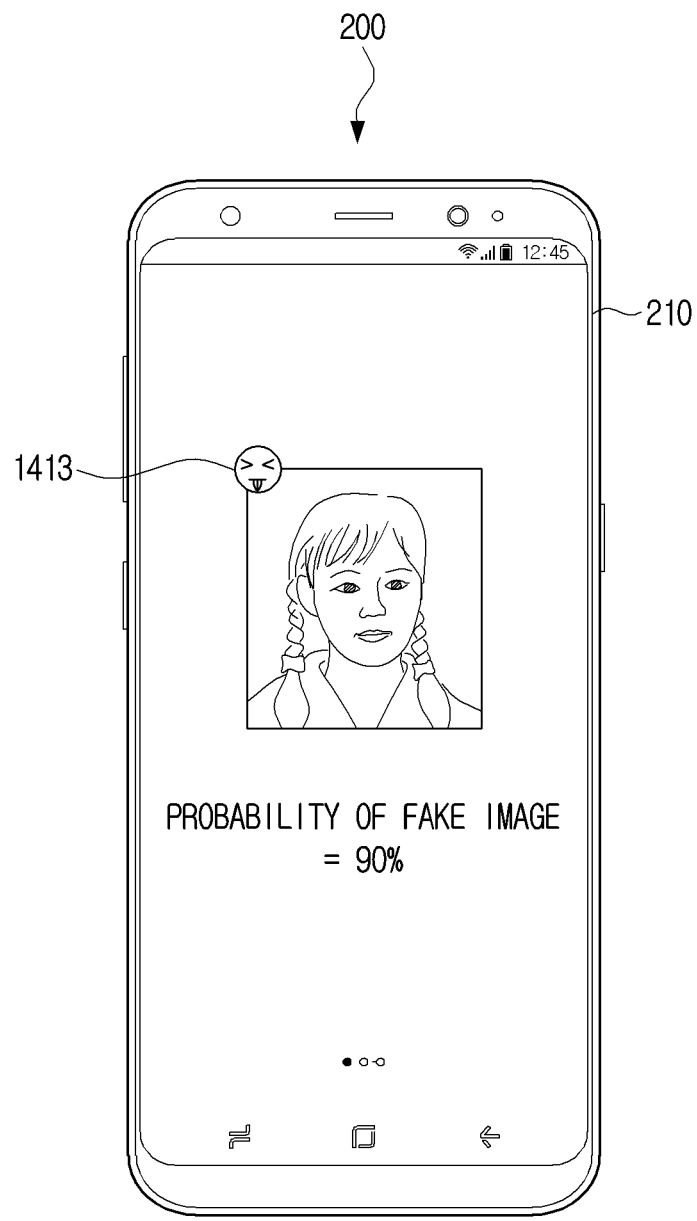

In addition, as shown in FIG. 14B, the processor 240 may display an emoticon 1413 indicating that the image is a fake image on the display 210.

Figure 14C:
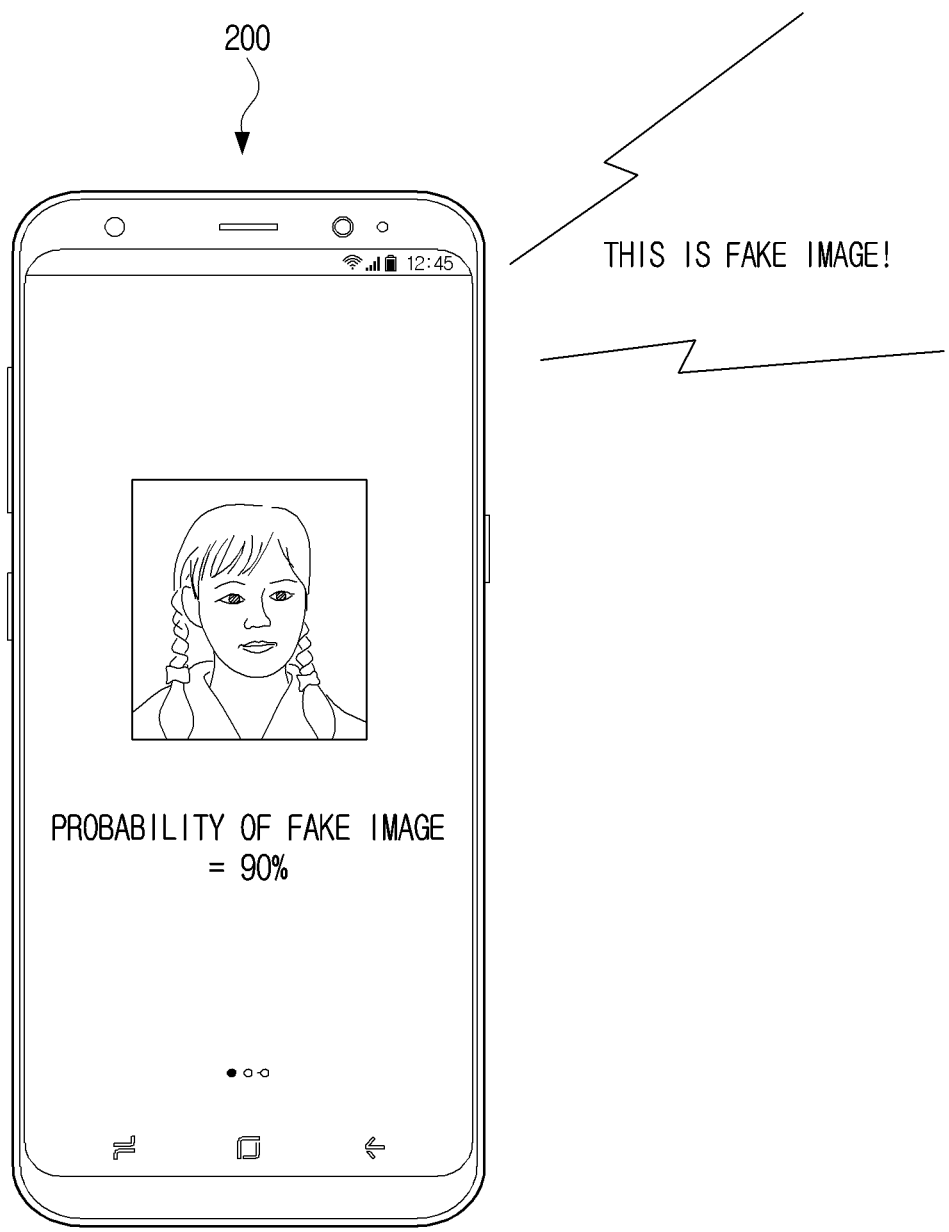

In addition, as shown in FIG. 14C, as shown in FIG. 14C, the processor 240 may output audio indicating that the image is a fake image such as "this is a fake image" through a speaker of the electronic device 200, as shown in FIG. 14C.

A function related to artificial intelligence may operate through the processors 120, 240 and the memory 110, 230.

The processors 120, 240 may include one or a plurality of processors. The one or a plurality of processors may be a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like. The one or more processors may control processing of the input data according to a predefined operating rule or AI model stored in the memory 110. If the one or a plurality of processor is an AI-only processor, the processor may be designed with a hardware structure specialized for the processing of a particular AI model.

The pre-defined operational rule or AI model are made through training.

Here, "being made through training" may refer to a predetermined operating rule or AI model set to perform a desired feature is made by making a basic AI model trained using various training data using training algorithm.

The training may be performed by a device itself where artificial intelligence is performed.

When training is performed in the server 100, for example, the processor 120 may determine pixels corresponding to the landmarks in each of the original images and the fake images, adjust the determined pixel values of the pixels to a predetermined pixel value, and generate images including information on the landmarks. In addition, the processors 120 and 240 may train the artificial intelligence model 111 using original images and fake images including information about the landmark.

The processor 120 may determine at least one of the range of the color value of the face area and the difference between the forehead area and the cheek are in each of the original images and the fake images, and train the artificial intelligence model 111 using the data with the images including the information on the landmark.

The processor 120 may classify the original images and the fake images into a plurality of groups according to the pose of the face included in each of the original images and the fake images, and train the artificial intelligence models 111-1 through 111-5 using the images included in each group.

This is merely some examples, and the training may be accomplished through the electronic device 200, a separate server and/or system, but is not limited thereto.

Examples of training algorithms include, but are not limited to, supervised learning, unsupervised learning, semi-supervised learning, or reinforcement learning.

The AI model may include a plurality of neural network layers. Each of the plurality of neural network layers includes a plurality of weight values, and may perform a neural network processing operation through an iterative operation leveraging results of a previous layer and a plurality of weight values. The plurality of weight values included in the plurality of neural network layers may be optimized by training results of the AI model. For example, the weight values may be updated such that a loss value or a cost value obtained by the AI model is reduced or minimized during the training process.

The artificial neural network may include convolutional Neural Network (CNN)-based AlexNet, VGGNet, GoogLe-Net, Inception, Xception, ShuffleNet, MesoNet, MobileNet, SqueezeNet, or the like. The artificial neural network may include deep neural network (DNN), recurrent neural network (RNN), restricted Boltzmann machine (RBM), deep belief network (DBN), bidirectional recurrent deep neural network (BRDNN), deep Q-networks, or the like, but is not limited thereto.

Figure 15:
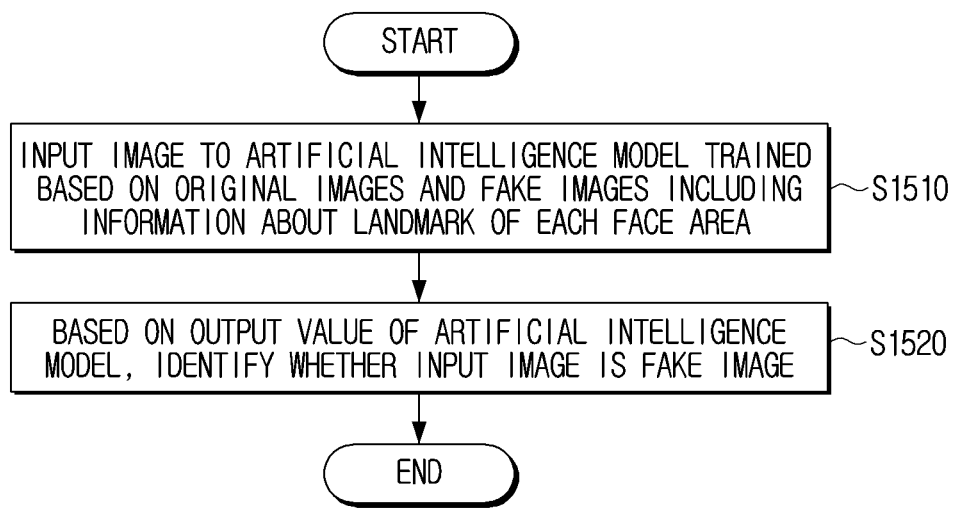
FIG. 15 is a flowchart illustrating a method of controlling a server according to an embodiment of the disclosure.

FIG. 15 is a flowchart illustrating a method of controlling a server according to an embodiment of the disclosure.

An image may be input to an artificial intelligence model trained to identify a fake image in operation S1510.

Based on the output value of the artificial intelligence model, it is possible to identify whether the input image is a fake image in operation S1520.

The artificial intelligence model may be a model trained based on original images and sample fake images, each including information about a landmark of each of a face area.

The artificial intelligence model may be a model trained based on the original images in which a pixel value of a pixel corresponding to the landmark in a face area included in each of the original images is adjusted to a predetermined pixel value and the sample fake images in which a pixel value of a pixel corresponding to the landmark in a face area included in each of the sample fake images is adjusted to a predetermined pixel value.

The artificial intelligence model may be a model trained based on at least one of a range of a color value of the face area included in each of the original images and the sample fake images and a difference of a brightness value between a forehead area and a cheek area in the face area.

The artificial intelligence model may be one of a plurality of artificial intelligence models stored in the server, each of the plurality of artificial intelligence models may be a model trained based on each of a plurality of groups in which the original images and the sample fake images are classified according to a pose of a face included in each of the original images and the sample fake images, and the operation S1510 may include determining a pose of a face included in the image and inputting the image to an artificial intelligence model, among the plurality of artificial intelligence models, corresponding to the determined pose.

A specific description of an artificial intelligence model and identifying a fake image using the artificial intelligence image have been described.

Figure 16:
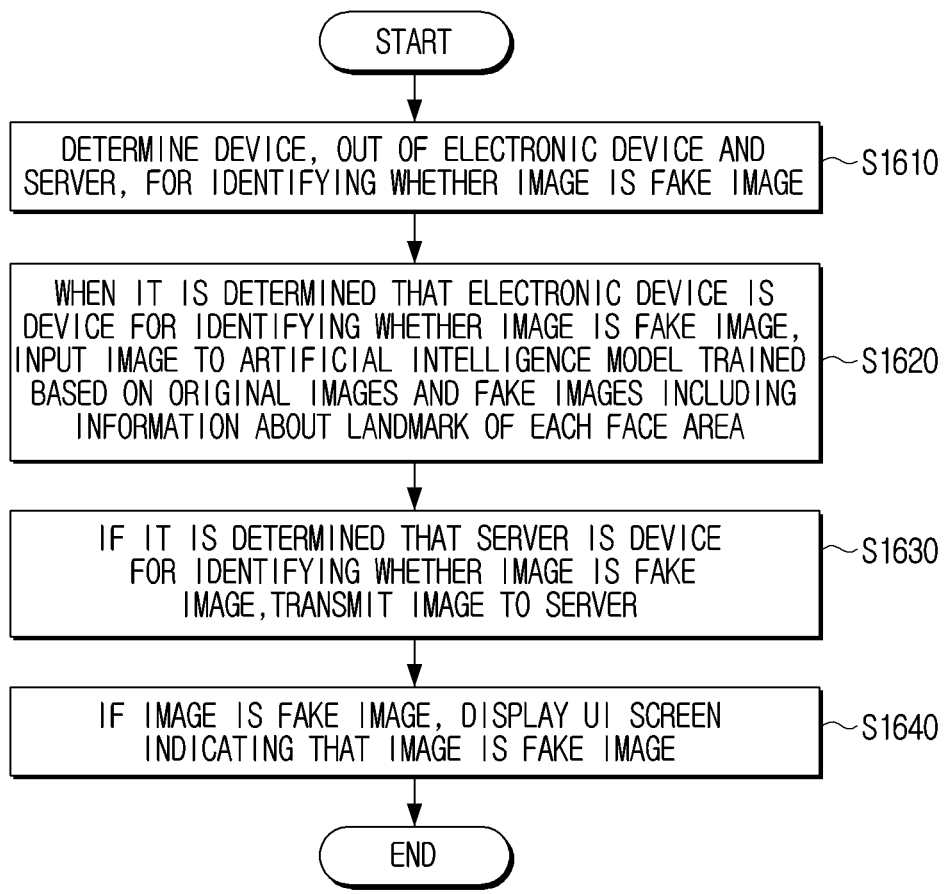
FIG. 16 is a flowchart illustrating a method of controlling an electronic device according to an embodiment of the disclosure.

FIG. 16 is a flowchart illustrating a method of controlling an electronic device according to an embodiment of the disclosure.

The electronic device may store an artificial intelligence model trained to identify a fake image.

In operation S1610, a device from among the electronic device and the server, for identifying whether an image is a fake image may be determined.

When it is determined that the electronic device is a device for identifying whether an image is a fake image, the electronic device may input the image to an artificial intelligence model to identify whether the image is a fake image in operation S1620.

If it is determined that the server is a device for identifying whether the image is a fake image, the image may be transmitted to the server in operation S1630.

If the image is a fake image, a UI screen indicating that the image is a fake image may be displayed in operation S1640. In addition, even if the image is not determined as a fake image, the UI screen may display a result indicating that the image is not fake, and display a probability value of the image being fake.

The artificial intelligence model may be a model trained based on original images and fake images including information about a landmark of each of a face area.

The artificial intelligence model may be a model trained based on the original images in which a pixel value of a pixel corresponding to a landmark in a face area included in each of the original images is adjusted to a predetermined pixel value, and the fake images in which a pixel value of a pixel corresponding to the landmark in the face area included in each of the fake images is adjusted to a predetermined pixel value.

The operation S1610 may include determining a device, from among the electronic device and the server, to identify whether the image is a fake image, based on at least one of a device, from among the electronic device and the server, set according to a user command, a network state of the electronic device, a size of the image, a type of the image, a size of a face area included in the image, or a number of face areas.

The operation S1610 may include, based on the device set according to the user command being the electronic device, determining that the electronic device is a device to identify whether the image is a fake image, and based on the device set according to the user command being the server, determining that the server is a device to identify whether the image is a fake image.

The operation S1610 may include determining a device, from among the electronic device and the server, to identify whether the image is a fake image based on at least one of the network state of the electronic device, the size of the image, the type of the image, the size of the face area included in the image, and the number of the face areas, using a look-up table stored in the electronic device.

The artificial intelligence model stored in the memory may be a model in which the artificial intelligence model stored in the server is compressed.

Determining a device for identifying a fake image by an electronic device and performing an operation according thereto has been described above.

The various example embodiments as described above may be implemented with software including instructions stored in the machine-readable storage media readable by a machine (e.g., a computer). A machine is a device which may call instructions from the storage medium and operate according to the called instructions, and may include an electronic device of the embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal (e.g., electromagnetic wave) but is tangible, and does not distinguish the case in which a data is semi-permanently stored in a storage medium from the case in which a data is temporarily stored in a storage medium. For example, "non-transitory storage medium" may refer to a buffer temporarily storing data.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

While various example embodiments of the disclosure have been illustrated and described herein, it will be understood that the various example embodiments are intended to be illustrative, thus, should not be construed as limiting the scope of the disclosure. One of ordinary skill in the art will understand that various changes in form and details may be made without departing from the true spirit and scope of the disclosure as set forth herein, for example, in the appended claims and their equivalents.

What is claimed is:

1. A server comprising:
a memory storing an artificial intelligence model trained to identify a fake image; and
a processor connected to the memory configured to identify whether an image is the fake image by inputting the image to the artificial intelligence model,
wherein the artificial intelligence model is a model trained based on an original image and a sample fake image, each including information about a landmark of a face area, and
wherein the artificial intelligence model is trained based on the original image in which a first pixel value of a first pixel corresponding to a first landmark in a first face area included in the original image is adjusted to a first predetermined pixel value and based on the sample fake image in which a second pixel value of a second pixel corresponding to a second landmark in a second face area included in the sample fake image is adjusted to a second predetermined pixel value.

2. The server of claim 1, wherein the artificial intelligence model trained based on at least one of a range of a color value of the face area included in each of a plurality of original images and a plurality of sample fake images, and a difference in a brightness value between a forehead area of the face area and a cheek area of the face area.

3. The server of claim 1, wherein the artificial intelligence model is one of a plurality of artificial intelligence models stored in the memory,
wherein each of the plurality of artificial intelligence models is trained based on a plurality of groups in which a plurality of original images and a plurality of sample fake images are classified according to a first pose of a first face included in each of the plurality of original images and each of the plurality of sample fake images, and
wherein the processor is further configured to determine a second pose of a second face included in the image, and identify whether the image is the fake image by inputting the image to one of the plurality of artificial intelligence models corresponding to the determined second pose of the second face included in the image.

4. An electronic device comprising:
a display;
a communication interface configured to communicate with a server;
a memory storing an artificial intelligence model trained to identify a fake image, wherein the artificial intelligence model is trained based on an original image and a sample fake image comprising information about a landmark of a face area in each of the original image and the sample fake image; and
a processor connected to the display and the communication interface, and the memory, and configured to:
determine one from among the electronic device and the server is a device to identify whether an image is the fake image,
based on determining that the electronic device is the device to identify whether the image is the fake image, identify whether the image is the fake image by inputting the image to the artificial intelligence model,
based on determining that the server is the device to identify whether the image is the fake image, transmit the image to the server through the communication interface, and receive, from the server, a result of whether the image is the fake image, and
based on the image being the fake image, display a user interface (UI) screen indicating that the image is the fake image on the display.

5. The electronic device of claim 4, wherein the artificial intelligence model is trained based on the original image in which a first pixel value of a first pixel corresponding to a first landmark in a first face area included in the original image is adjusted to a first predetermined pixel value, and based on the sample fake image in which a second pixel value of a second pixel corresponding to a second landmark in a second face area included in the sample fake image is adjusted to a second predetermined pixel value.

6. The electronic device of claim 4, wherein the processor is further configured to determine one from among the electronic device and the server is the device to identify whether the image is the fake image, based on a user command, a network state of the electronic device, a size of the image, a type of the image, a size of the face area included in the image, or a number of face areas.

7. The electronic device of claim 6, wherein the processor is further configured to, based on the user command indicating the device is the electronic device, determine that the electronic device is the device to identify whether the image is the fake image, and based the user command indicating the device is the server, determine that the server is the device to identify whether the image is the fake image.

8. The electronic device of claim 6, wherein the processor is further configured to access a look-up table stored in the memory to determine one from among the electronic device and the server is the device to identify whether the image is the fake image, the look-up table storing at least one of the network state of the electronic device, the size of the image, the type of the image, the size of the face area included in the image, and the number of face areas.

9. The electronic device of claim 4, wherein the artificial intelligence model stored in the memory is an artificial intelligence model stored in the server that is compressed.

10. A method of controlling a server, the method comprising:
inputting an image to an artificial intelligence model trained to identify a fake image; and
identifying whether the image is the fake image based on an output value of the artificial intelligence model,
wherein the artificial intelligence model is a model trained based on an original image and a sample fake image, each including information about a landmark of each of a face area, and
wherein the artificial intelligence model is trained based on the original image in which a first pixel value of a first pixel corresponding to a first landmark in a first face area included in the original image is adjusted to a first predetermined pixel value and based on the sample fake image in which a second pixel value of a second pixel corresponding to a second landmark in a second face area included in the sample fake image is adjusted to a second predetermined pixel value.

11. The method of claim 10, wherein the artificial intelligence model is trained based on at least one of a range of a color value of the face area included in each of a plurality of original images and a plurality of sample fake images, and a difference in a brightness value between a forehead area of the face area and a cheek area in the face area.

12. The method of claim 10, wherein the artificial intelligence model is one of a plurality of artificial intelligence models stored in the server,
wherein each of the plurality of artificial intelligence models is trained based on a plurality of groups in which a plurality of original images and a plurality of sample fake images are classified according to a first pose of a first face included in each of the plurality of original images and each of the plurality of sample fake images, and
wherein the inputting further comprises determining a second pose of a second face included in the image and inputting the image to one of the plurality of artificial intelligence models, corresponding to the determined second pose of the second face included in the image.

13. A method of controlling an electronic device storing an artificial intelligence model trained to identify a fake image, the method comprising:
determining one from among the electronic device and a server is a device to identify whether an image is the fake image;

based on determining that the electronic device is the device to identify whether the image is the fake image, identifying whether the image is the fake image by inputting the image to the artificial intelligence model stored in the electronic device;

based on determining that the server is the device to identify whether the image is the fake image, transmitting the image to the server through a communication interface of the electronic device, and receiving, from the server, a result of whether the image is the fake image; and based on the image being the fake image, displaying a user interface (UI) screen indicating that the image is the fake image, wherein the artificial intelligence model is a model trained based on an original image and a sample fake image, each including information about a landmark of each of a face area.

* * * * *